US012758916B2

(12) United States Patent
Karousos et al.

(10) Patent No.: US 12,758,916 B2
(45) Date of Patent: Oct. 13, 2026

(54) MAGNETIC SWING ABSORPTION

(71) Applicant: Khalifa University of Science and Technology, Abu Dhabi (AE)

(72) Inventors: Dionysios Karousos, Attica (GR); Andreas Sapalidis, Attica (GR); Georgios Karanikolos, Abu Dhabi (AE); Evangelos Favvas, Attica (GR)

(73) Assignee: Khalifa University of Science and Technology, Abu Dhabi (AE)

(*) Notice: Subject to any disclaimer, the term of this patent is extended or adjusted under 35 U.S.C. 154(b) by 472 days.

(21) Appl. No.: 18/021,052

(22) PCT Filed: Sep. 2, 2021

(86) PCT No.: PCT/IB2021/058040
§ 371 (c)(1),
(2) Date: Feb. 13, 2023

(87) PCT Pub. No.: WO2022/058832
PCT Pub. Date: Mar. 24, 2022

(65) Prior Publication Data
US 2023/0302399 A1 Sep. 28, 2023

Related U.S. Application Data

(60) Provisional application No. 63/078,433, filed on Sep. 15, 2020.

(51) Int. Cl.
*B01D 53/14* (2006.01)
*B01J 20/28* (2006.01)

(52) U.S. Cl.
CPC ..... *B01D 53/1425* (2013.01); *B01D 53/1493* (2013.01); *B01J 20/28009* (2013.01);
(Continued)

(58) Field of Classification Search
CPC ............ B01D 53/1425; B01D 53/1493; B01D 2252/30; B01D 2252/60; B01D 2257/504; B01D 2252/602; B01J 20/28009
See application file for complete search history.

(56) References Cited

U.S. PATENT DOCUMENTS 341,727 A * 5/1886 Cabell ...................... C12H 1/16
210/243
4,049,398 A * 9/1977 Vaseen .................. B01D 53/00
95/28

(Continued)

FOREIGN PATENT DOCUMENTS

CN 101636584 A * 1/2010 ......... E21B 23/0415
CN 106943853 A 7/2017

(Continued)

OTHER PUBLICATIONS

"International Search Report and Written Opinion Received mailed Sep. 27, 2021", 11 pages for PCT Application No. PCT/IB2021/058040.

(Continued)

*Primary Examiner* — Stephen Hobson
(74) *Attorney, Agent, or Firm* — Billion & Armitage

(57) ABSTRACT

Embodiments include a method of magnetic swing absorption, which may include contacting a fluid mixture including one or more gases and a liquid absorbent in a separation chamber; absorbing at least one of said gases using the liquid absorbent, optionally in the presence of a constant inhomogeneous magnetic field; and desorbing the at least one absorbed gas from the liquid absorbent, optionally in the presence of the constant inhomogeneous magnetic field. Embodiments further include other related methods, related systems and apparatuses, and the like.

14 Claims, 14 Drawing Sheets

(52) U.S. Cl.
CPC ...... *B01D 2252/30* (2013.01); *B01D 2252/60* (2013.01); *B01D 2257/504* (2013.01)

(56) References Cited

U.S. PATENT DOCUMENTS

| | | | | | |
|---|---|---|---|---|---|
| 4,142,874 | A * | 3/1979 | Vaseen | C01B 21/50 95/186 |
| 4,704,139 | A * | 11/1987 | Yamamoto | B03C 1/00 96/9 |
| 4,707,523 | A * | 11/1987 | Chang | H01F 1/42 525/329.9 |
| H591 | H | 3/1989 | Leupold et al. | |
| 5,925,168 | A * | 7/1999 | Judkins | B01D 53/047 96/108 |
| 7,771,509 | B1 | 8/2010 | Brown | |
| 9,186,616 | B2 | 11/2015 | Baugh et al. | |
| 10,763,021 | B1 * | 9/2020 | Parisien | H01F 7/20 |
| 12,350,623 | B1 * | 7/2025 | Sangaru | B01D 53/1425 |
| 2005/0129598 | A1 | 6/2005 | Chinn et al. | |
| 2008/0307960 | A1 * | 12/2008 | Hendrickson | B01J 20/28057 502/411 |
| 2009/0289213 | A1 * | 11/2009 | Pipper | C07K 1/22 252/62.51 R |
| 2010/0077752 | A1 * | 4/2010 | Papile | B01D 53/08 505/891 |
| 2011/0005390 | A1 * | 1/2011 | Haugan | B01D 53/62 95/27 |
| 2012/0042778 | A1 * | 2/2012 | Jung | B01D 53/1481 548/341.1 |
| 2012/0063978 | A1 | 3/2012 | Baugh et al. | |
| 2012/0202897 | A1 * | 8/2012 | Keskinen | C10K 1/005 423/220 |
| 2013/0225898 | A1 * | 8/2013 | Sundaram | C07C 7/12 585/824 |
| 2013/0298761 | A1 * | 11/2013 | Hamad | B01D 53/1493 96/242 |
| 2014/0099245 | A1 * | 4/2014 | Hamad | B01D 53/62 96/242 |
| 2014/0318370 | A1 * | 10/2014 | Broderick | B01D 53/1493 95/156 |
| 2014/0319419 | A1 * | 10/2014 | Broderick | B01D 53/1475 252/190 |
| 2015/0027055 | A1 * | 1/2015 | Kortunov | C10L 3/103 48/127.3 |
| 2015/0245547 | A1 * | 8/2015 | Robinson, Jr. | A61L 9/015 156/39 |
| 2016/0256851 | A1 * | 9/2016 | Glover | G01N 33/5438 |
| 2018/0140993 | A1 * | 5/2018 | Martinez Palou | C10L 3/104 |
| 2018/0272269 | A1 * | 9/2018 | Goetheer | C01B 3/52 |
| 2019/0282992 | A1 * | 9/2019 | Shekhawat | B01J 19/126 |
| 2020/0246746 | A1 * | 8/2020 | Mendoza | B01J 20/0277 |
| 2020/0282379 | A1 * | 9/2020 | Mulet | B01D 53/261 |
| 2020/0338496 | A1 * | 10/2020 | Karanikolos | B01D 53/228 |
| 2022/0134307 | A1 * | 5/2022 | Sadiq | B01D 53/02 95/108 |

FOREIGN PATENT DOCUMENTS

| | | | | |
|---|---|---|---|---|
| CN | 111514701 | A * | 8/2020 | B01D 53/047 |
| CN | 111565817 | A * | 8/2020 | B01D 53/0423 |
| DE | 3624626 | A1 | 1/1988 | |
| DE | 10246984 | A1 | 4/2004 | |
| EP | 0674936 | A2 * | 10/1995 | B01D 53/1493 |
| WO | WO-0038831 | A1 * | 7/2000 | B01J 20/3234 |
| WO | 2012067719 | A1 | 5/2012 | |
| WO | 2014142661 | A2 | 9/2014 | |
| WO | 2015017240 | A1 | 2/2015 | |
| WO | 2016144179 | A1 | 9/2016 | |
| WO | 2019012317 | A1 | 1/2019 | |

OTHER PUBLICATIONS

Sadiq, M. , et al., "Engineered Porous Nanocomposites That Deliver Remarkably Low Carbon Capture Energy Costs", Cell Reports Physical Science 1, 100070, Jun. 24, 2020, pp. 1-12.

* cited by examiner $t_{OFF}$: Magnetic field is removed

MAGNETIC SWING ABSORPTION

BACKGROUND

Conventional gas separation processes have high energy requirements. For example, conventional gas separation processes require generating high temperatures for heat-assisted absorbent regeneration, pumping liquid absorbents between absorption towers and regeneration towers, processing and handling of byproducts, repairing absorbent leakage problems caused by the considerable vapor pressures, and replenishing the lost absorbent. In addition to being energy intensive, these processes contribute significantly to the operational cost of a gas separation process. Gas separation processes with lower energy requirements and lower operational costs would be a substantial advancement in the art.

SUMMARY

According to one or more aspects of the invention, a method of magnetic swing absorption may include contacting a fluid mixture including one or more gases and a liquid absorbent in a separation chamber; absorbing at least one of said gases using the liquid absorbent, optionally in the presence of a constant inhomogeneous magnetic field; and desorbing the at least one absorbed gas from the liquid absorbent, optionally in the presence of the constant inhomogeneous magnetic field.

According to one or more further aspects of the invention, a system for magnetic swing absorption may include at least one absorption cell including a separation chamber including an inlet and an outlet; a liquid absorbent disposed within the separation chamber, wherein the liquid absorbent is used for selective absorption of one or more gases from a fluid mixture; and a magnet surrounding the separation chamber, wherein the magnet is configured to produce a constant inhomogeneous magnetic field in the presence of the liquid absorbent to initiate or enhance one or more of absorption of the one or more gases and desorption of the one or more gases.

DETAILED DESCRIPTION

Figure 1:
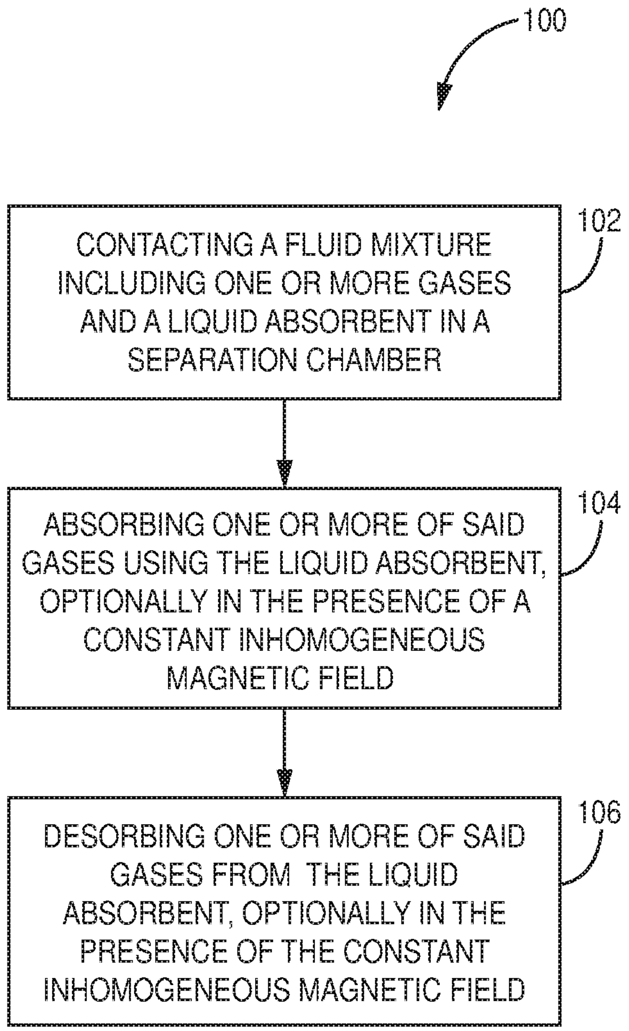
FIG. 1 is a flowchart of a method of gas separation, according to one or more embodiments of the invention.

The present invention relates to absorption-based gas separations involving liquid absorbents and applied magnetic fields. It has been discovered that a magnetic field may be applied to at least a portion of a liquid absorbent in contact with a fluid mixture including one or more gases to enhance absorption-based gas separation processes. One example of a suitable magnetic field is a constant inhomogeneous magnetic field which is a magnetic field having a magnetic flux density that is constant with time and varies in space thereby forming a gradient. Depending on the composition of the liquid absorbent, the constant inhomogeneous magnetic field may be applied during an absorption step or a desorption step of a gas separation process to selectively separate one or more gases from a fluid mixture. For example, in some embodiments, the constant inhomogeneous magnetic field may be applied to the liquid absorbent to promote selective absorption of at least one gas from a fluid mixture. Alternatively, in some embodiments, the constant inhomogeneous magnetic field may be applied to the liquid absorbent to promote selective desorption of the at least one absorbed gas.

The absorption-based gas separations disclosed herein may be used to separate any fluid mixture, including gas mixtures. For example, a constant inhomogeneous magnetic field may be applied to magnetic liquid absorbents to separate any gas mixture. Unlike conventional methods, the present invention does not require that the fluid and/or gas mixture include at least one paramagnetic gas (e.g., gas molecules attracted by a magnetic field) and at least one diamagnetic gas (e.g., gas molecules repelled by a magnetic field) in order to achieve the separation. In other words, the present invention is not restricted to gas mixtures that contain a paramagnetic gas, but rather can be applied to any gas mixture irrespective of whether a paramagnetic gas is present or not. For example, any mixture of gases may be employed herein without regard or irrespective of whether said mixture includes paramagnetic gases and/or diamagnetic gases. For example, in some embodiments, any fluid and/or gas mixture may be employed to separate gases, without regard to whether the fluid mixture includes paramagnetic and/or diamagnetic gases, provided that the magnetic liquid absorbent is selective for the absorption of a desired gas species. In addition, the absorption-based gas separations disclosed herein avoid energy-intensive and costly processes of pumping liquid absorbent, generating heat for desorption, and achieving high pressurizations. In addition, selective absorption and/or selective desorption may be induced simply by applying or removing (e.g., turning on or off) an external magnetic field, instead of the high energy consuming steps of gas pressurization and thermal regeneration.

Accordingly various embodiments provide methods of absorption-based gas separation under the influence of a magnetic field and related devices and related systems that may be used to separate any fluid mixture (e.g., gas mixture), irrespective of whether the gases are paramagnetic and/or diamagnetic, without requiring the consumption of energy to generate heat for desorption, without requiring any energy for absorbent pumping, and without requiring any energy to achieve high pressurizations for absorption. The methods disclosed herein may be based on the indirect influence of a constant inhomogeneous magnetic field on gas absorption kinetics of the most selectively absorbing gas. More specifically, the magnetic field may exert a force on a liquid absorbent that changes a gas-liquid interface, in terms of surface area and/or composition, which in turn alters the absorbed gas amount versus time curve in comparison to the absorbed gas amount versus time curve obtained in the absence of the magnetic field. Switching the magnetic field on and off may correspond to switching from one absorbed gas amount versus time curve to another one, effectively "swinging" the absorbed gas amount between said curves. Selective gas absorption may take place during the transition from the lower absorbed gas amount versus time curve to the higher absorbed gas amount versus time curve, while selective gas desorption may take place during the transition from the higher absorbed gas amount versus time curve to the lower absorbed gas amount versus time curve.

For example, embodiments including methods and related systems and related devices for removing a most selectively absorbing gas from a fluid mixture, with the aid of a liquid absorbent, are provided, where the most selectively absorbing gas is absorbed by the liquid absorbent during an absorption step and desorbed by the liquid absorbent during a desorption step, while the liquid absorbent is positioned at least partially within a constant inhomogeneous magnetic field during either the absorption step or the desorption step, wherein the liquid absorbent is (i) a paramagnetic ionic liquid, (ii) a suspension of magnetic nanoparticles in a liquid absorbent, (iii) a liquid absorbent with particles or other solid material capable of interacting with magnetic fields, or any of (i) to (iii) with an additional foaming agent dissolved therein, wherein the presence of the magnetic field affects the surface area and/or composition of the interface formed between the liquid absorbent and fluid mixture and wherein, at least for the most selectively absorbing gas, the absorbed gas amount versus time curve in the presence of the magnetic field differs from the absorbed gas amount versus time curve without in the absence of the magnetic field.

FIG. 1 is a flowchart of a method of gas separation, according to one or more embodiments of the invention. As shown in FIG. 1, the method 100 may include one or more of the following steps: contacting 102 a fluid mixture including one or more gases and a liquid absorbent in a separation chamber; absorbing 104 one or more of said gases using the liquid absorbent, optionally in the presence of a constant inhomogeneous magnetic field; and desorbing 106 one or more of said gases from the liquid absorbent, optionally in the presence of the constant inhomogeneous magnetic field. In some embodiments, the fluid mixture includes at least a first gas and a second gas and the method 100 further includes, after the absorbing step 104, purging a second fluid mixture which is enriched in either the first gas or the second gas from the separation chamber. In some embodiments, the fluid mixture includes a first gas and a second gas and the method 100 further includes, after the desorbing step 108, purging a third fluid mixture which is enriched in either the first gas or the second gas from the separation chamber.

According to step 102, the fluid mixture and the liquid absorbent may be contacted in the separation chamber. The contacting of the fluid mixture and the liquid absorbent is not particularly limited. For example, in some embodiments, the contacting may include admitting, either simultaneously or sequentially, the liquid absorbent and fluid mixture into the separation chamber where they may be brought into contact or at least immediate or close proximity. In some embodiments, the contacting may be performed by feeding the fluid mixture to a separation chamber including the liquid absorbent. In embodiments in which the liquid absorbent includes a foaming agent, the contacting may or should be sufficient to form a stable foam. One or more of the fluid mixture and liquid absorbent may be admitted to the separation chamber until it is pressurized to a pressure of $P_1+dP_1$, wherein $P_1$ represents the pressure of gases not to be absorbed by the liquid absorbent and wherein $dP_1$ represents the pressure of gases to be absorbed by the liquid absorbent. The separation chamber may include any enclosure suitable for facilitating the contacting of the fluid mixture and the liquid absorbent. In some embodiments, the separation chamber forms part of an absorption cell which may be closed or opened and may have a cylindrical shape or any other shape. In some embodiments, a closed cylindrical absorption cell including a separation chamber is used.

The fluid mixture may include any gas or mixture of gases. In some embodiments, the fluid mixture includes a mixture of at least two different types of gases. For example, in some embodiments, the fluid mixture includes at least a first gas and a second gas, and the liquid absorbent is selective for the absorption of at least the first gas over at least the second gas. Although gas mixtures including at least one paramagnetic gas and at least one diamagnetic gas are permitted, it is not required that the fluid mixture include at least one paramagnetic gas (e.g., gas molecules attracted by a magnetic field), with the balance of the fluid mixture including one or more diamagnetic gases (e.g., gas molecules repelled by a magnetic field). Accordingly, fluid mixtures may include any combination of gases irrespective of whether the gases are paramagnetic and/or diamagnetic. For example, fluid mixtures consisting of one or more paramagnetic gases, fluid mixtures consisting of one or more diamagnetic gases, and fluid mixtures including one or more paramagnetic gases and one or more diamagnetic gases may be utilized herein. In some embodiments, the fluid mixture may include any mixture of gases, provided that the liquid absorbent is selective for the absorption of at least one of said gases. In some embodiments, the fluid mixture includes one or more of hydrogen, methane, helium, carbon dioxide, nitrogen, oxygen, $C_{2+}$ alkanes (e.g., ethane, propane, butane, propane, and so on), olefins, paraffins, hydrogen sulfide, ammonia, water or water vapor, carbon monoxide, nitrogen oxides, sulfur oxides, sulfur, siloxanes, and the like.

The liquid absorbent may comprise or consist of one or more of an ionic liquid, a solid magnetic component, and a foaming agent. In some embodiments, the liquid absorbent includes an ionic liquid and a solid magnetic component. For example, in some embodiments, the liquid component includes a solid magnetic component dispersed or suspended in an ionic liquid. In some embodiments, the liquid absorbent includes an ionic liquid, a solid magnetic component, and a foaming agent. For example, in some embodiments, the liquid absorbent includes a solid magnetic component dispersed or suspended in an ionic liquid, and a foaming agent dissolved therein. In some embodiments, the liquid absorbent includes a paramagnetic liquid, wherein the paramagnetic liquid includes a magnetic ionic liquid. For example, in some embodiments, the liquid absorbent includes a paramagnetic ionic liquid. In some embodiments, the liquid absorbent includes a paramagnetic ionic liquid and a foaming agent. For example, in some embodiments, the liquid absorbent includes a foaming agent dissolved in a paramagnetic ionic liquid. In some embodiments, the solid magnetic component includes one or more of magnetic particles, magnetic nanoparticles, and any other solid capable of interacting with a magnetic field.

In some embodiments the liquid absorbent includes (i) a paramagnetic ionic liquid, (ii) a suspension of magnetic nanoparticles in a liquid absorbent, or (iii) a liquid absorbent with particles or other solid material that can interact with magnetic fields, or any one of (i) to (iii) with an additional dissolved foaming agent. In some embodiments, the liquid absorbent includes a paramagnetic liquid such as a magnetic ionic liquid. In some embodiments, the liquid absorbent includes a paramagnetic liquid such as a magnetic ionic liquid with a foaming agent dissolved therein. In some embodiments, the liquid absorbent includes a suspension of magnetic nanoparticles in an ionic liquid. In some embodiments, the liquid absorbent includes nanoparticles with permanent magnetic moments dispersed in an ionic liquid. In some embodiments, the liquid absorbent includes ionic liquid ferrofluid. In some embodiments, the liquid absorbent includes a suspension of magnetic nanoparticles, such as an ionic liquid ferrofluid, with a foaming agent dissolved therein.

In some embodiments, the paramagnetic ionic liquid includes one or more of trihexyl(tetradecyl)phosphonium ($[P_{6,6,6,14}^+]$), 1-ethyl-3-me thylimidazolium ($[EMIM^+]$), 1-butyl-3-methylimidazolium ($[BMIM^+]$), 1-hexyl-3-methylimidazolium ($[C_6MIM^+]$), 1-octyl-3-methylimidazolium ($[C_8MIM^+]$), tetrachlorocobalt ($[CoCl_4^-]$), tetrachloroferrate ($[FeCl_4^-]$), tetrachloromanganese ($[MnCl_4^-]$), hexachlorogadolinium ($[GdCl_6^-]$), and tetrabromoferrate ($[FeBr_4^-]$). For example, in some embodiments, the paramagnetic ionic liquid includes one or more of trihexyl(tetradecyl)phosphonium tetrachlorocobalt ($[P_{6,6,6,14}][CoCl_4]$), trihexyl(tetradecyl)phosphonium tetrachloroferrate ($[P_{6,6,6,14}][FeCl_4]$), trihexyl(tetradecyl)phosphonium tetrachloromanganese ($[P_{6,6,6,14}][MnCl_4]$), trihexyl(tetradecyl)phosphonium hexachlorogadolinium ($[P_{6,6,6,14}][GdCl_6]$), 1-ethyl-3-methylimidazolium tetrachlorocobalt ($[EMIM^+][CoCl_4^-]$), 1-ethyl-3-methylimidazolium tetrachloroferrate ($[EMIM^+][FeCl_4^-]$), 1-ethyl-3-methylimidazolium tetrachloromanganese ($[EMIM^+][MnCl_4^-]$), 1-ethyl-3-methylimidazolium hexachlorogadolinium ($[EMIM^+][GdCl_6^-]$), 1-ethyl-3-methylimidazolium tetrabromoferrate ($[EMIM^+][FeBr_4^-]$), 1-butyl-3-methylimidazolium tetrachlorocobalt ($[BMIM^+][CoCl_4^-]$), 1-butyl-3-me thylimidazolium tetrachloroferrate ($[BMIM^+][FeCl_4^-]$), 1-butyl-3-me thylimidazolium tetrachloromanganese ($[BMIM^+][MnCl_4^-]$), 1-butyl-3-methylimidazolium hexachlorogadolinium ($[BMIM^+][GdCl_6^-]$), 1-butyl-3-methylimidazolium tetrabromoferrate ($[BMIM^+][FeBr_4^-]$), 1-hexyl-3-methylimidazolium tetrachlorocobalt ($[C_6MIM^+][CoCl_4^-]$), 1-hexyl-3-methylimidazolium tetrachloroferrate ($[C_6MIM^+][FeCl_4^-]$), 1-hexyl-3-methylimidazolium tetrachloromanganese ($[C_6MIM^+][MnCl_4^-]$), 1-hexyl-3-methylimidazolium hexachlorogadolinium ($[C_6MIM^+][GdCl_6^-]$), 1-hexyl-3-methylimidazolium tetrabromoferrate ($[C_6MIM^+][FeBr_4^-]$), 1-octyl-3-methylimidazolium tetrachlorocobalt ($[C_8MIM^+][CoCl_4^-]$), 1-octyl-3-methylimidazolium tetrachloroferrate ($[C_8MIM^+][FeCl_4^-]$), 1-octyl-3-methylimidazolium tetrachloromanganese ($[C_8MIM^+][MnCl_4^-]$), 1-octyl-3-methylimidazolium hexachlorogadolinium ($[C_8MIM^+][GdCl_6^-]$), and 1-octyl-3-methylimidazolium tetrabromoferrate ($[C_8MIM^+][FeBr_4^-]$).

In some embodiments, the ionic liquid includes a cation and an anion. In some embodiments, the cation includes one or more of 1-ethyl-3-methylimidazolium, butyltrimethylammonium, 1-butyl-3-methylimidazolium, 1-methyl-3-propylimidazolium, 1-hexyl-3-methylimidazolium, choline, ethylammonium, tributylmethylphosphonium, tributyl (tetradecyl)phosphonium, trihexyl(tetradecyl)phosphonium, 1-ethyl-2,3-methylimidazolium, 1-butyl-1-methylpiperidinium, diethylmethylsulfonium, 1-methyl-3-propylimidazolium, 1-methyl-1-propylpiperidinium, 1-butyl-2-methylpyridinium, 1-butyl-4-methylpyridinium, 1-butyl-1-methylpyrrolidinium, and diethylmethylsulfonium. In some embodiments, the anion includes one or more of tetrafluoroborate, tris(pentafluoroethyl)trifluorophosphate, trifluoromethanesulfonate, hexafluorophosphate, tetrafluoroborate, ethyl sulfate, dimethyl phosphate, methansulfonate, triflate, tricyanomethanide, dibutylphosphate, bis(trifluoromethylsulfonyl)imide, bis-2,4,4-(trimethylpentyl) phosphinate, iodide, chloride, bromide, and nitrate. In some embodiments, the ionic liquid is a paramagnetic ionic liquid.

In some embodiments, the solid magnetic component may include any solid material capable of interacting with a magnetic field. In some embodiments, the solid magnetic component includes solids with permanent magnetic moments. For example, in some embodiments, the solid magnetic component includes one or more of particles and nanoparticles with permanent magnetic moments. In some embodiments, the solid magnetic component includes one or more metals, one or more metal oxides, and/or one or more metal alloys. In some embodiments, the solid magnetic component includes one or more of Fe, Co, Ni, Pt, Sm, Mn, Zn, Ba, Al, Mg, and the like. In some embodiments, the solid magnetic component includes magnetic nanoparticles including one or more of Fe, Co, Ni, Pt, Sm, Mn, Zn, Ba, Al, and Mg. In some embodiments, the solid magnetic component includes magnetic nanoparticles including one or more of CoPt, FePt, FeCo, MnAl, MnBi, SmCo, and ZnMn.

A foaming agent and/or surfactant should not spoil the gas mixture with its vapors, as may be the case in some instances with fluorocarbon foaming agents, etc. A suitable foaming agent should not mix with the fluid components. Any foaming agent and/or surfactant should have negligible vapor pressure in order to avoid mixing with the gas phase. Accordingly, in some embodiments, the foaming agent and/or surfactant has a negligible vapor pressure. In some embodiments, the foaming agent includes chemical foaming agents, physical foaming agents (e.g., organic foaming agents and/or inorganic foaming agents), and the like, provided that the foaming agent (e.g., including a surfactant) has a negligible vapor pressure. In some embodiments, the foaming agent includes one or more of the following: water and azo-, carbonate- and hydrazide-based molecules including, e.g., 4,4'-oxybis (benzenesulfonyl)hydrazide, 4,4'-oxybenzenesulfonyl semicarbazide, azodicarbonamide, p-toluenesulfonyl semicarbazide, barium azodicarboxylate, azodiisobutyronitrile, benzenesulfonhydrazide, trihydrazinotriazine, metal salts of azodicarboxylic acids, oxalic acid hydrazide, hydrazocarboxylates, diphenyloxide-4,4'-disulphohydrazide, tetrazole compounds, sodium bicarbonate, ammonium bicarbonate, preparations of carbonate compounds and polycarbonic acids, and mixtures of citric acid and sodium bicarbonate, N,N'-dimethyl-N,N'-dinitroso-terephthalamide, N,N'-dinitrosopentamethylenetetramine, and combinations thereof. In some embodiments, the foaming agent includes one or more of nitrogen, argon, oxygen, water, air, helium, sulfur hexafluoride and combinations thereof. In some embodiments, the foaming agent includes one or more of carbon dioxide, aliphatic hydrocarbons, aliphatic alcohols, fully and partially halogenated aliphatic hydrocarbons including, e.g., methylene chloride, and combinations thereof. Examples of suitable aliphatic hydrocarbon foaming agents include members of the alkane series of hydrocarbons including, e.g., methane, ethane, propane, n-butane, isobutane, n-pentane, isopentane and blends thereof. Useful aliphatic alcohols include, e.g., methanol, ethanol, n-propanol, and isopropanol and combinations thereof. Suitable fully and partially halogenated aliphatic hydrocarbons include, e.g., fluorocarbons, chlorocarbons, and chlorofluorocarbons and combinations thereof. Examples of fluorocarbon foaming agents include methyl fluoride, perfluoromethane, ethyl fluoride,), 1,1-difluoroethane (HC-152a), fluoroethane (HFC-161), 1,1,1-trifluoroethane (HFC-143a), 1,1,1,2-tetrafluoroethane (HFC-134a), 1,1, 2,2 tetrafluoroethane (HFC-134), 1,1,1,3,3-pentafluoropropane, pentafluoroethane (HFC-125), difluoromethane (HFC-32), perfluoroethane, 2,2-difluoropropane, 1,1,1-trifluoropropane, perfluoropropane, dichloropropane, difluoropropane, perfluorobutane, perfluorocyclobutane and combinations thereof. Useful partially halogenated chlorocarbon and chlorofluorocarbon foaming agents include methyl chloride, methylene chloride, ethyl chloride, 1,1,1-trichloroethane, 1,1-dichloro-1-fluoroethane (HCFC-141 b), 1-chloro-1,1-difluoroethane (HCFC-142b), chlorodifluoromethane (HCFC-22), 1,1-dichloro-2,2,2-trifluoroethane (HCFC-123) and 1-chloro-1,2,2,2-tetrafluoroethane (HCFC-124) and combinations thereof.

In some embodiments, the foaming agent is combined with one or more surfactants to stabilize the liquid absorbent foam and form a stable liquid absorbent foam. Suitable surfactants may include one or more of non-ionic surfactants, cationic surfactants, anionic surfactants, zwitterionic surfactants, and the like. In some embodiments, the surfactant includes one or more of pluronic F-127, t-octylphenoxypolyethoxyethanol (Triton X-100), polyoxyethylenesorbitan monolaurate (Tween 20), polyoxyethylenesorbitan monolaurate (Tween 21), polyoxyethylenesorbitan monopalmitate (Tween 40), polyoxyethylenesorbitan monostearate (Tween 60), polyoxyethylenesorbitan monooleate (Tween 80), polyoxyethylenesorbitan monotrioleate (Tween 85), (octylphenoxy)polyethoxyethanol (IGEPAL CA-630/NP-40), triethyleneglycol monolauryl ether (Brij 30), and sorbitan monolaurate (Span 20).

According to step 104, one or more gases may be absorbed using the liquid absorbent. The absorbing step 104 may be performed in the presence or in the absence of a constant inhomogeneous magnetic field. In some embodiments, the application of the constant inhomogeneous magnetic field may depend, at least in part, on the selection of the liquid absorbent. For example, in embodiments in which the liquid absorbent includes a foaming agent, the absorbing step may be performed in the absence of the constant inhomogeneous magnetic field, or at least the constant inhomogeneous magnetic field may be removed which may be the case where at least one absorption/desorption cycle has already been performed. As will be discussed further below, in these embodiments, the constant inhomogeneous magnetic field may be applied to selectively desorb one or more absorbed gases. Alternatively, in embodiments in which the liquid absorbent does not include a foaming agent, the constant inhomogeneous magnetic field may be applied to at least a portion of the liquid absorbent, such as the portion which is in contact with the fluid mixture, to initiate and/or enhance absorption of the one or more gases. That is, in some embodiments, the absorption step is performed by applying a constant inhomogeneous magnetic field to at least a portion of the liquid absorbent.

The constant inhomogeneous magnetic field may be applied to deform and/or alter the composition of the interfacial area provided between the fluid mixture and the liquid absorbent. In other words, in some embodiments, the constant inhomogeneous magnetic field may exert a force on the liquid absorbent that changes the gas-liquid interface in terms of surface area and/or composition. For example, the presence and/or absence of the constant inhomogeneous magnetic field may increase and/or decrease one or more of the interfacial surface area, the selective absorption rate of a gas, and the selective desorption rate of a gas. In some embodiments absorbed gas amounts at absorption equilibrium remain unaltered. The constant inhomogeneous magnetic field may exert a translational magnetic force on any magnetic moment present in the liquid absorbent. For example, in some embodiments, the constant inhomogeneous magnetic field may exert a translational magnetic force on the permanent magnetic moments of molecules of a paramagnetic ionic liquid. In some embodiments, the constant inhomogeneous magnetic field may exert a translational magnetic force on magnetic particles dispersed in a liquid absorbent. This translational magnetic force may be analogous to the vector-matrix product of magnetic flux density vector $\vec{B}$ multiplied by the magnetic flux density gradient matrix $\nabla\vec{B}$. Accordingly, deformation and/or alteration of the interfacial area and/or composition between the fluid mixture and liquid absorbent may be favored when the magnetic flux density and magnetic flux density gradient of the magnetic field are maximized in the region of the liquid absorbent. In some embodiments, applying the constant inhomogeneous magnetic field to the liquid absorbent affects gas absorption rate of a most selectively absorbing gas (e.g., kinetic may remain unaltered, while rate of absorption may become enhanced due, for example, to interfacial area enhancement). The magnetic flux density may range from about 0.1 T to about 50 T. In some embodiments, the magnetic flux density is about 2T.

In some embodiments, the gas separation method is performed using a liquid absorbent that does not include a foaming agent. In at least some of these embodiments, the constant inhomogeneous magnetic field may be applied to at least the portion of the liquid absorbent that is in contact with the fluid mixture. In some embodiments, applying the constant inhomogeneous magnetic field initiates the absorption of one or more gases, or at least one of a first gas and a second gas. In some embodiments, applying the constant inhomogeneous magnetic field enhances the absorption of at least one of the first gas and the second gas by deforming the interface between the liquid absorbent and fluid mixture so as to increase the surface area of said interface. For example, in some embodiments, application of the constant inhomogeneous magnetic field forms a meniscus with surface area $S_1$ at the interface between the liquid absorbent and the fluid mixture, wherein the surface area $S_1$ is greater than the surface area in the absence of the constant inhomogeneous magnetic field.

In some embodiments, the absorption of at least one of the first gas and the second gas may continue until the pressure is reduced from a pressure of $P_1+dP_1$ to a pressure of $P_1$ and/or until time $t_{off}$ which is when the constant inhomogeneous magnetic field is removed or turned off. In some embodiments, while at least one of the first gas and the second gas is being absorbed by the liquid absorbent, a second fluid mixture enriched with the non-absorbed gas is produced (second fluid mixture is what remains non-absorbed in the fluid phase above the liquid absorbent). For example, where the non-absorbed fluid mixture may be a second gas-enriched fluid mixture or a first gas-enriched fluid mixture, respectively. In some embodiments, the second fluid mixture has a pressure of $P_1$ or about $P_1$. In some embodiments, in step 106 after step 104, the second fluid mixture is swept out or purged from the separation chamber to a second fluid mixture buffer, optionally in the presence of the constant inhomogeneous magnetic field—that is, while the constant inhomogeneous magnetic field is still being applied. In some embodiments, the second fluid mixture is purged from the separation chamber by flowing a fresh first fluid mixture (e.g., from a high pressure stream) through said chamber, optionally while maintaining a pressure $P_1$ using, for example, a front pressure regulator.

In some embodiments, the gas separation method is performed using a liquid absorbent that includes a foaming agent. In some embodiments, a liquid absorbent including a foaming agent forms a stable foam which is used for selective absorption of one or more gases, such as at least one of a first gas and a second gas. In at least some of these embodiments, the absorption of one or more gases is carried out in the absence of the constant inhomogeneous magnetic field. For example, in some embodiments, the absorption of at least one of a first gas and a second gas is performed by removing the constant inhomogeneous magnetic field, or at least when the constant inhomogeneous magnetic field is turned off. In some embodiments, the absorption of at least one of the first gas and the second gas is allowed to proceed at least until the pressure within the separation chamber has been reduced from a pressure of $P_1+dP_1$ to a pressure of $P_1$ and/or until the constant inhomogeneous magnetic field is applied or turned on.

In some embodiments, while at least one of the first gas and the second gas is being absorbed by the liquid absorbent foam, a second fluid mixture enriched with the non-absorbed gas is produced. For example, where the non-absorbed gas includes the second gas or the first gas, the second fluid mixture may include a second gas-enriched fluid mixture or a first gas-enriched fluid mixture, respectively. In some embodiments, the second fluid mixture has a pressure of $P_1$ or about $P_1$. In some embodiments, the second fluid mixture is swept out or purged from the separation chamber to a second fluid mixture buffer, optionally in the absence of the constant inhomogeneous magnetic field—that is, while the constant inhomogeneous magnetic field is still off or not applied. In some embodiments, the second fluid mixture is purged from the separation chamber by flowing a fresh first fluid mixture (e.g., from a high pressure stream) through said chamber, optionally while maintaining a pressure $P_1$ using, for example, a front pressure regulator.

According to step 106, one or more gases may be desorbed from the liquid absorbent. The desorbing step 106 may be performed in the presence or in the absence of the constant inhomogeneous magnetic field. In some embodiments, the application of the constant inhomogeneous magnetic field may depend, at least in part, on the selection of the liquid absorbent. For example, in embodiments in which the liquid absorbent does not include a foaming agent, the desorbing step may be performed in the absence of the constant inhomogeneous magnetic field, or at least the constant inhomogeneous magnetic field may be removed from at least a portion of the liquid absorbent to initiate desorption of the one or more absorbed gases. In embodiments in which the liquid absorbent includes a foaming agent, the constant inhomogeneous magnetic field is applied to at least a portion of the liquid absorbent, such as the portion which was in contact with the fluid mixture, to initiate desorption of the one or more absorbed gases. That is, in some embodiments, the desorption step may be performed by applying the constant inhomogeneous magnetic field to at least a portion of the liquid absorbent.

In embodiments in which the liquid absorbent does not include a foaming agent, the desorption of one or more gases from the liquid absorbent is initiated when the constant inhomogeneous magnetic field is removed or turned off at time $t_{off}$. In some embodiments, the selective desorption of one or more gases proceeds until the pressure within the separation chamber has increased from a pressure of $P_1$ to a pressure of $P_1+dP_1$. In some embodiments, the desorption of one or more gases from the liquid absorbent produces a third fluid mixture which is enriched with the one or more desorbed gases. For example, where the first gas or second gas is desorbed from the liquid absorbent, the third fluid mixture may include a first gas-enriched fluid mixture or a second gas-enriched fluid mixture, respectively. In some embodiments, the third fluid mixture is swept out or purged from the separation chamber to a third fluid mixture buffer, optionally in the absence of the inhomogeneous magnetic field—that is, while the constant inhomogeneous magnetic field is still off or not applied. In some embodiments, the third fluid mixture is purged from the separation chamber by flowing a fresh first fluid mixture (e.g., from a high pressure stream) through said chamber, optionally while maintaining a pressure $P_1+dP_1$ using, for example, a front pressure regulator.

In embodiments in which the liquid absorbent includes a foaming agent, the desorption of one or more gases from the liquid absorbent foam is initiated when the constant inhomogeneous magnetic field is applied or turned on at time ton. In some embodiments, applying the constant inhomogeneous magnetic field causes the stable liquid absorbent foam to destabilize and break inside the separation chamber, leading to a reduction in the surface area of the interface between the liquid absorbent foam and the fluid mixture. Due to this reduction, selective desorption of the one or more gases may proceed until the pressure within the separation chamber increases from a pressure $P_1$ to a pressure of $P_1+dP_1$. In some embodiments, the desorption of one or more gases from the liquid absorbent foam produces a third fluid mixture which is enriched with the one or more desorbed gases. For example, where the first gas or second gas is desorbed from the liquid absorbent foam, the third fluid mixture may include a first gas-enriched fluid mixture or a second gas-enriched fluid mixture, respectively. In some embodiments, the third fluid mixture is swept out or purged from the separation chamber to a third fluid mixture buffer, optionally in the presence of the inhomogeneous magnetic field—that is, while the constant inhomogeneous magnetic field is still on or applied. In some embodiments, the third fluid mixture is purged from the separation chamber by flowing a fresh first fluid mixture (e.g., from a high pressure stream) through said chamber, optionally while maintaining a pressure $P_1+dP_1$ using, for example, a front pressure regulator.

According to some embodiments, lab-scale investigations were undertaken which recorded absorbed gas amount versus time curves during volumetric absorption measurements of carbon dioxide using a magnetic ionic liquid absorbent, namely 1-butyl-3-methylimidazolium tetrachloroferrate which is selective for carbon dioxide, with and without the presence of a 2T constant inhomogeneous magnetic field, as well as by removing or applying said magnetic field during absorption, before equilibrium was reached. Lab scale trials were conducted in a volumetric absorption apparatus, equipped with a magnet. Other magnetic ionic liquids and liquid absorbents, including those described above, may be utilized herein without departing from the scope of the present invention. These examples illustrate that the methods of magnetic field-assisted gas separations utilize magnetic fields that may be used to separate any gas mixture, without regard to whether the gases are paramagnetic or diamagnetic, or without requiring certain combinations thereof (e.g., without requiring at least a paramagnetic gas and a diamagnetic gas in order to realize any separation). In addition, the following examples can be used for scaled-up processes for commercialization and/or used for lab-scale processes.

Figure 2A:
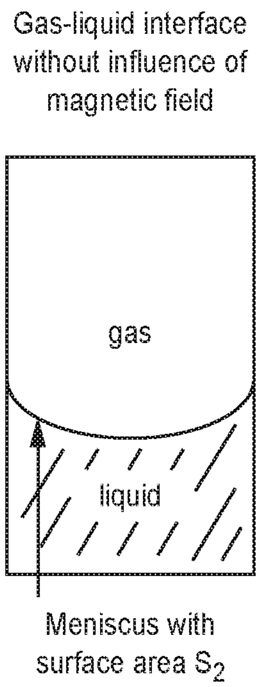
FIGS. 2A-2B are schematic diagrams illustrating a liquid absorbent interacting with a magnetic field: (A) showing a gas-liquid interface in the absence of a magnetic field and (B) showing a gas-liquid interface in the presence of a magnetic field, according to one or more embodiments of the invention.
Figure 2B:
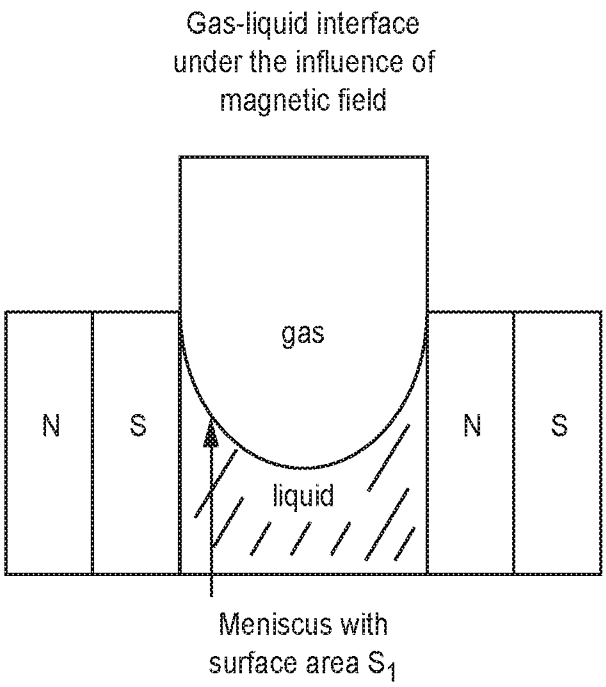
Figure 3:
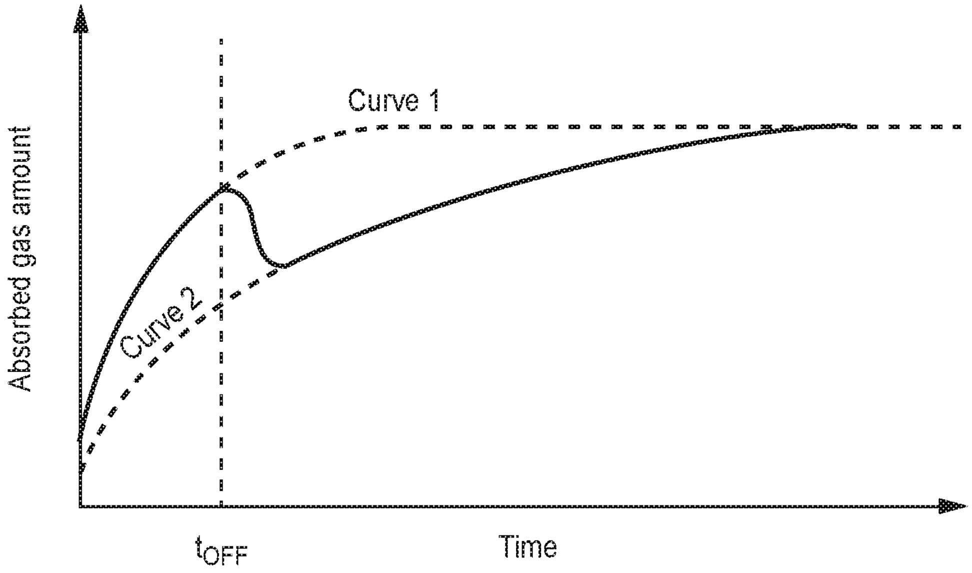
FIG. 3 is a graphical view of absorbed gas amount versus time to illustrate the effect of the magnetic field on the absorption and desorption of a gas, wherein the absorbed gas amount switches from curve 1 to curve 2 upon removal of the magnetic field, according to one or more embodiments of the invention.
Figure 4:
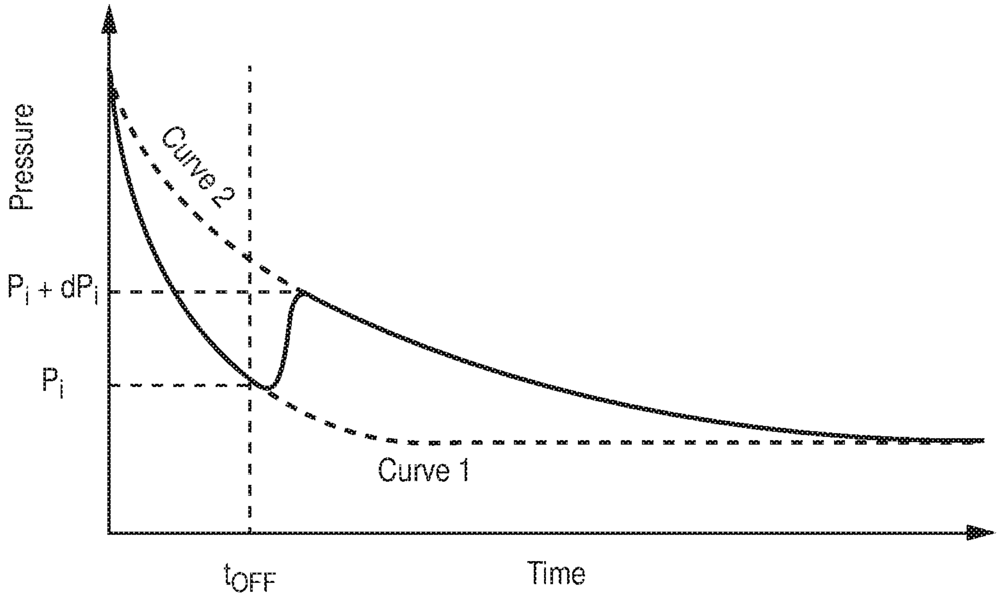
FIG. 4 is a graphical view of pressure versus time corresponding to curve 1 and curve 2 in FIG. 3, according to one or more embodiments of the invention.
Figure 5:
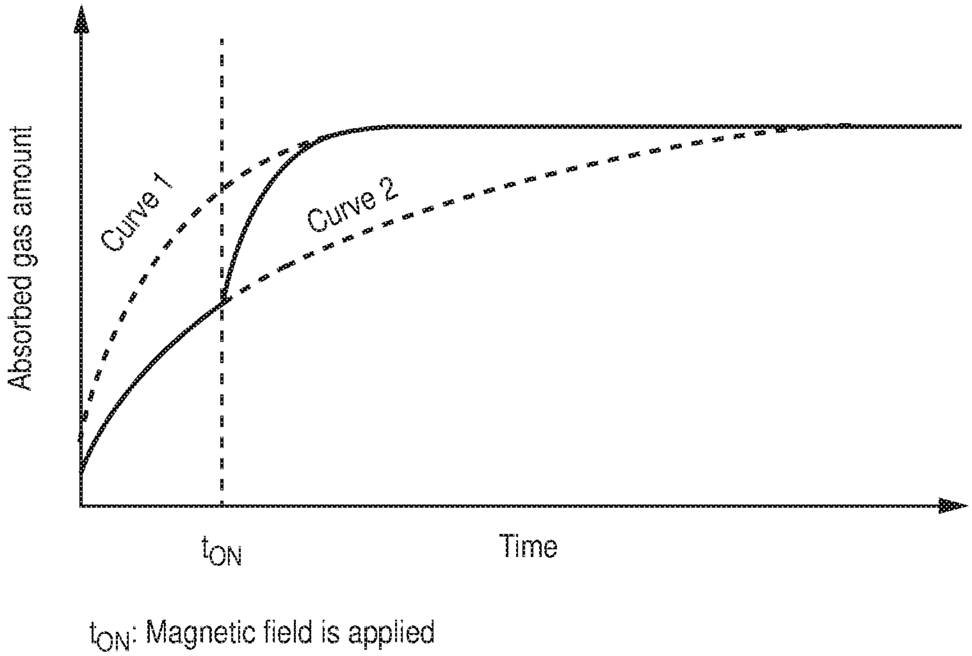
FIG. 5 is a graphical view of absorbed gas amount versus time to illustrate the effect of the magnetic field on the absorption of a gas, wherein the absorbed gas amount switches from curve 2 to curve 1 upon application of the magnetic field, according to one or more embodiments of the invention.
Figure 6:
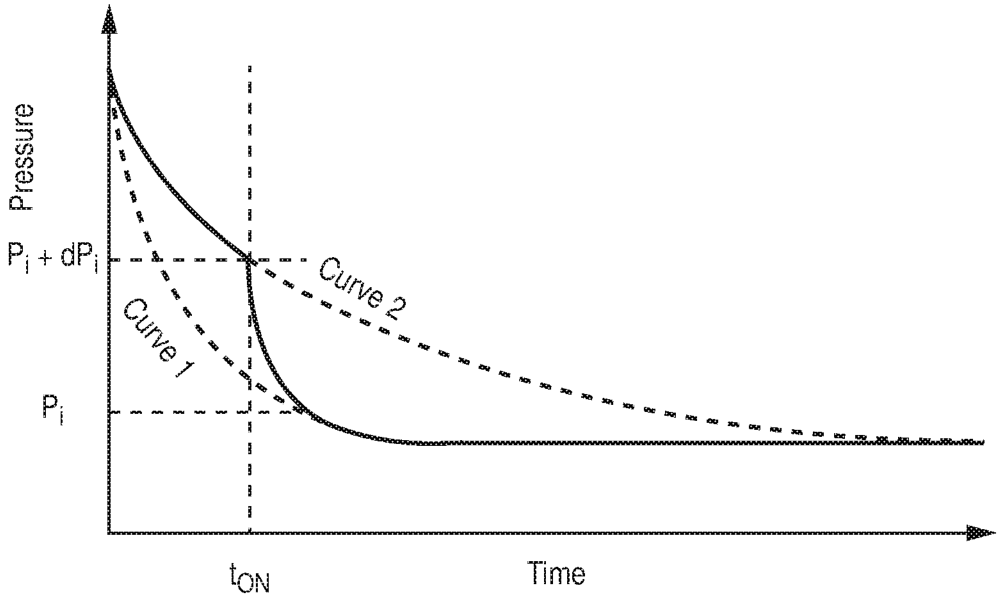
FIG. 6 is a graphical view of pressure versus time corresponding to curve 1 and curve 2 in FIG. 5, according to one or more embodiments of the invention.
Figure 7A:
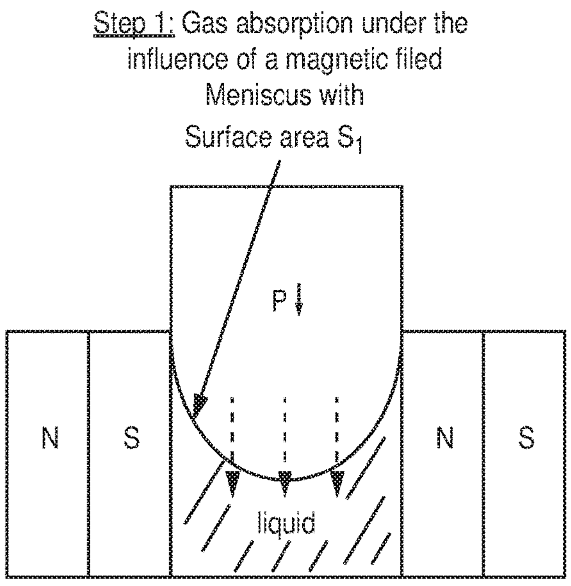
FIGS. 7A-7D is a schematic diagram illustrating four steps of a method of gas separation, according to one or more embodiments of the invention.
Figure 7B:
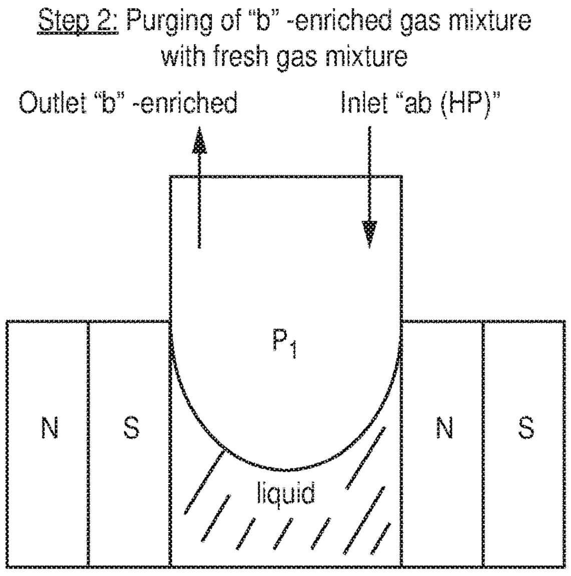
Figure 7C:
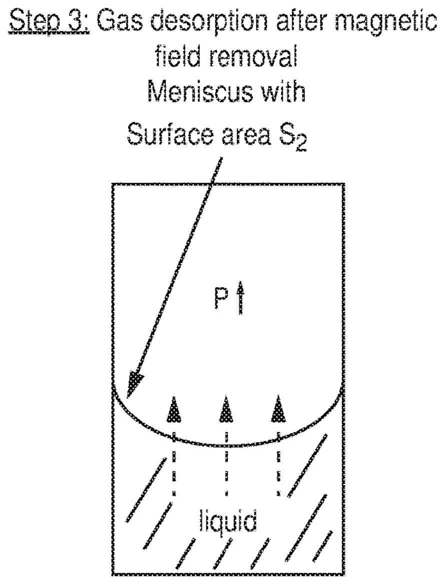
Figure 7D:
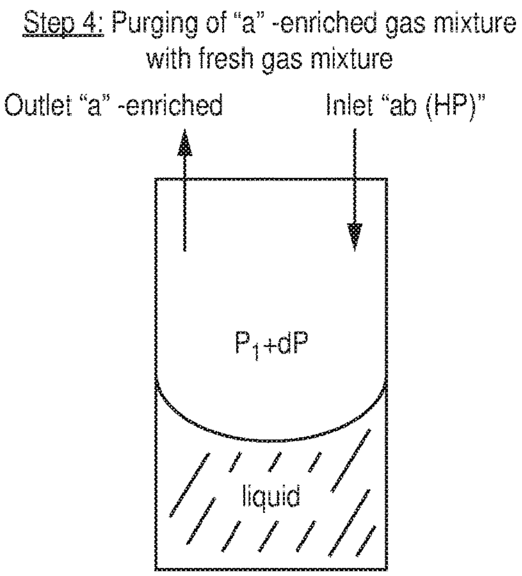

In some embodiments, absorption proceeds in the presence of a magnetic field. For example, in some embodiments, a magnetic swing absorption process may utilize a paramagnetic liquid, such as a magnetic ionic liquid, as a liquid absorbent for the separation of a more selectively absorbing first gas from a less selectively absorbing second gas. The magnetic ionic liquid may be contained inside a closed cylindrical gas absorption cell in such a way that it first comes into contact with a fluid mixture (e.g., gas mixture) including a first gas and a second gas, wherein the first gas is absorbed and the second gas is not absorbed. The fluid mixture may be admitted until the absorption cell is pressurized to a pressure of $P_1+dP_1$. The liquid absorbent may be positioned within a constant inhomogeneous magnetic field. In the presence of the constant inhomogeneous magnetic field, the interface between the magnetic ionic liquid and the fluid mixture may have the shape of a meniscus with a surface area $S_1$ (FIGS. 2A-2B). Up to time $t_{off}$, the absorption of the first gas may follow the absorbed gas amount versus time transient curve 1, as depicted in FIG. 3. Due to absorption, at time $t_{off}$ pressure is at a level of $P_1$ and the magnetic field is removed (or switched off), which may cause an instant change in the shape of the interface meniscus between the magnetic ionic liquid and the fluid mixture to form a new surface area $S_2$, which is significantly lower than the initial surface area $S_1$ as shown in FIGS. 2A-2B. The absorbed amount of the first gas after time $t_{off}$ tends to follow the absorbed gas amount versus time transient curve 2, which is below transient curve 1, and therefore initiates gas desorption. The actually followed transient curve is presented as a solid line in FIG. 3, while curves 1 and 2 are presented as dashed curves. At time $t_{off}$, just before the magnetic field is removed, the fluid mixture in the cell may have the highest enrichment in the second gas and the second gas-enriched gas mixture may be swept out or purged through the absorption cell outlet to a second gas-enriched buffer container. The purging may be performed by flowing a fresh fluid mixture volume through the absorption cell inlet via a high pressure stream, while maintaining the pressure at level $P_1$ using a front pressure regulator. Once the constant inhomogeneous magnetic field has been removed, desorption of the first gas occurs and the fluid mixture inside the cell may be enriched in the first gas until transient curve 2 is reached and desorption stops. This point may be defined by sensing pressure which is increasing due to desorption until reaching a maximum at a level of $P_1+dP_1$ (see FIG. 4). At this point, the gas mixture in the cell may have the highest enrichment in the first gas and the first gas-enriched fluid mixture may be swept out, through cell outlet connected to a first gas-enriched buffer container, by a fresh fluid mixture volume coming in through the absorption cell inlet via a high pressure stream, while maintaining the pressure at a level of $P_1+dP_1$. The same cycle may be repeated by applying again the initial magnetic field, until the pressure drops to the level $P_1$ and so on. See, for example, FIGS. 5-6.

FIGS. 7A-7D are a schematic diagram of a gas separation method, according to one or more embodiments of the invention. As shown in FIGS. 7A-7D, selective gas absorption may proceed under the influence of a constant inhomogeneous magnetic field until a separation chamber pressure is reduced from a pressure of $P_1+dP_1$ to a pressure level of $P_1$. A second gas-enriched fluid mixture (e.g., a fluid mixture enriched with the non-absorbed gas) may be purged from the separation chamber to a second gas-enriched fluid mixture buffer container by flowing a fresh fluid mixture through the separation chamber, while the separation chamber is maintained at a pressure of $P_1$. The constant inhomogeneous magnetic field may be removed and selective gas desorption may be allowed to proceed until the pressure increases to a pressure of $P_1+dP_1$. A first fluid-enriched fluid mixture (e.g., a fluid mixture enriched with the absorbed gas which has now been desorbed) may be purged from the separation chamber to a first gas-enriched fluid mixture buffer container by flowing a fresh fluid mixture through the separation chamber while the separation chamber is maintained at a pressure of $P_1+dP_1$. The constant inhomogeneous magnetic field may be re-applied and the steps depicted in FIGS. 7A-7D may be repeated one or more times.

In another embodiment in which absorption proceeds in the presence of a magnetic field, a magnetic swing absorption process may utilize a paramagnetic liquid, such as a suspension of magnetic nanoparticles in a liquid (e.g., an ionic liquid), as a liquid absorbent in the case of separating a more selectively absorbing first gas from a less selectively absorbing second gas. The suspension of magnetic nanoparticles in an ionic liquid may include nanoparticles with permanent magnetic moments dispersed in an ionic liquid. The liquid absorbent, for example, may include an ionic liquid ferrofluid. The steps described above in the example presented in FIGS. 7A-7D may be performed to complete an absorption/desorption cycle.

In some embodiments, desorption proceeds in the presence of a magnetic field. For example, in some embodiments, a magnetic swing absorption process may utilize a paramagnetic liquid, such as a magnetic ionic liquid, with a dissolved foaming agent, as the liquid absorbent in the case of separating a more selectively absorbing first gas from a less selectively absorbing second gas. The steps of absorption/desorption cycle may include feeding a first fluid mixture into a bulk of a liquid absorbent disposed in an absorption cell sufficient to form a stable magnetic liquid absorbent foam. This may be performed for example by bubbling the first fluid mixture through the liquid absorbent. Selective gas absorption of the first gas may be allowed to proceed until the cell pressure drops from a pressure of $P_1+dP_1$ to a pressure of $P_1$, in the absence of a constant inhomogeneous magnetic field. A second gas-enriched fluid mixture may be purged from the absorption cell through an outlet equipped with a foam filter breaker to a second gas-enriched buffer container by flowing a fresh first fluid mixture through the absorption cell, while the cell is maintained at a pressure of $P_1$ using, for example, a front pressure regulator. The constant inhomogeneous magnetic field may then be applied, leading to complete foam breaking inside the absorption cell. Due to a reduction in the surface area of the interface between the fluid mixture and the liquid absorbent, selective gas desorption may proceed until the pressure increases to a pressure of $P_1+dP_1$. The constant inhomogeneous magnetic field may be removed and the first gas-enriched fluid mixture may be purged from the absorption cell through the outlet to a first gas-enriched buffer container by flowing a fresh first fluid mixture through the absorption cell, while the cell is maintained at a pressure of $P_1+dP_1$. One or more of the foregoing steps may be repeated to perform another absorption and/or desorption cycle.

Figure 8A:
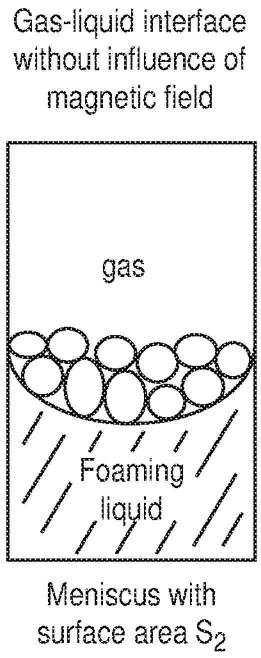
FIGS. 8A-8B are schematic diagrams illustrating a foaming liquid absorbent interacting with a magnetic field: (A) showing a gas-liquid interface in the absence of a magnetic field and (B) showing a gas-liquid interface in the presence of a magnetic field, according to one or more embodiments of the invention.
Figure 8B:
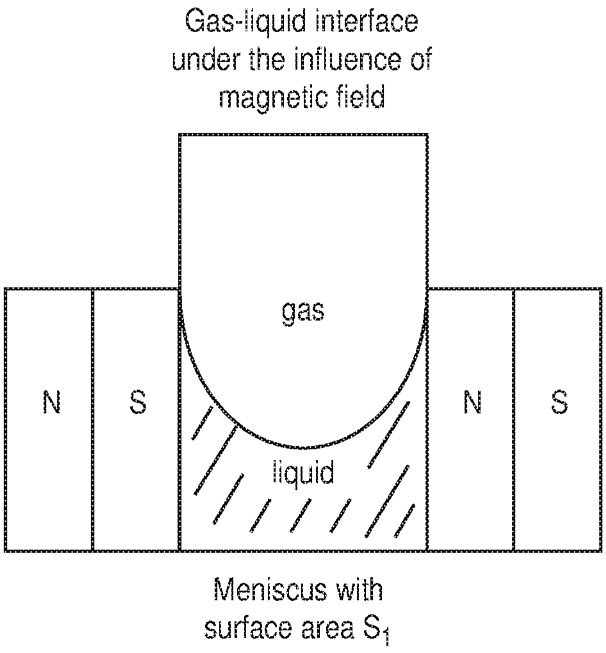

In some embodiments, where the liquid absorbent includes a foaming agent, a magnetic field may be applied to reduce the surface area of the gas-liquid interface, instead of increasing it. This may be achieved by applying a constant inhomogeneous magnetic field to break a magnetic liquid absorbent foam. In some embodiments, for example, a magnetic ionic liquid, such as 1-butyl-3-methylimidazolium tetrachloroferrate, which is a selective gas absorbent, may be easily broken by an externally applied constant inhomogeneous magnetic field, such as the magnetic field of a simple, grade N40 neodymium iron boron magnet or an assembly of permanent magnets such as a Halbach cylinder. FIGS. 8A-8B illustrate the concept of magnetic ionic liquid foam breaking using a permanent magnet. In some embodiments, it may be desirable to stabilize the magnetic liquid absorbent foam by adding one or more surfactants, such as Pluronic F-127.

In another embodiment in which desorption proceeds in the presence of a magnetic field, a magnetic swing absorption process may utilize a paramagnetic liquid, such as a suspension of magnetic nanoparticles in a liquid (e.g., an ionic liquid), with a foaming agent dissolved therein, as a liquid absorbent in the case of separating a more selectively absorbing first gas from a less selectively absorbing second gas. The steps described above, corresponding to FIGS. 8A-8B, may be performed to complete an absorption/desorption cycle.

Figure 9:
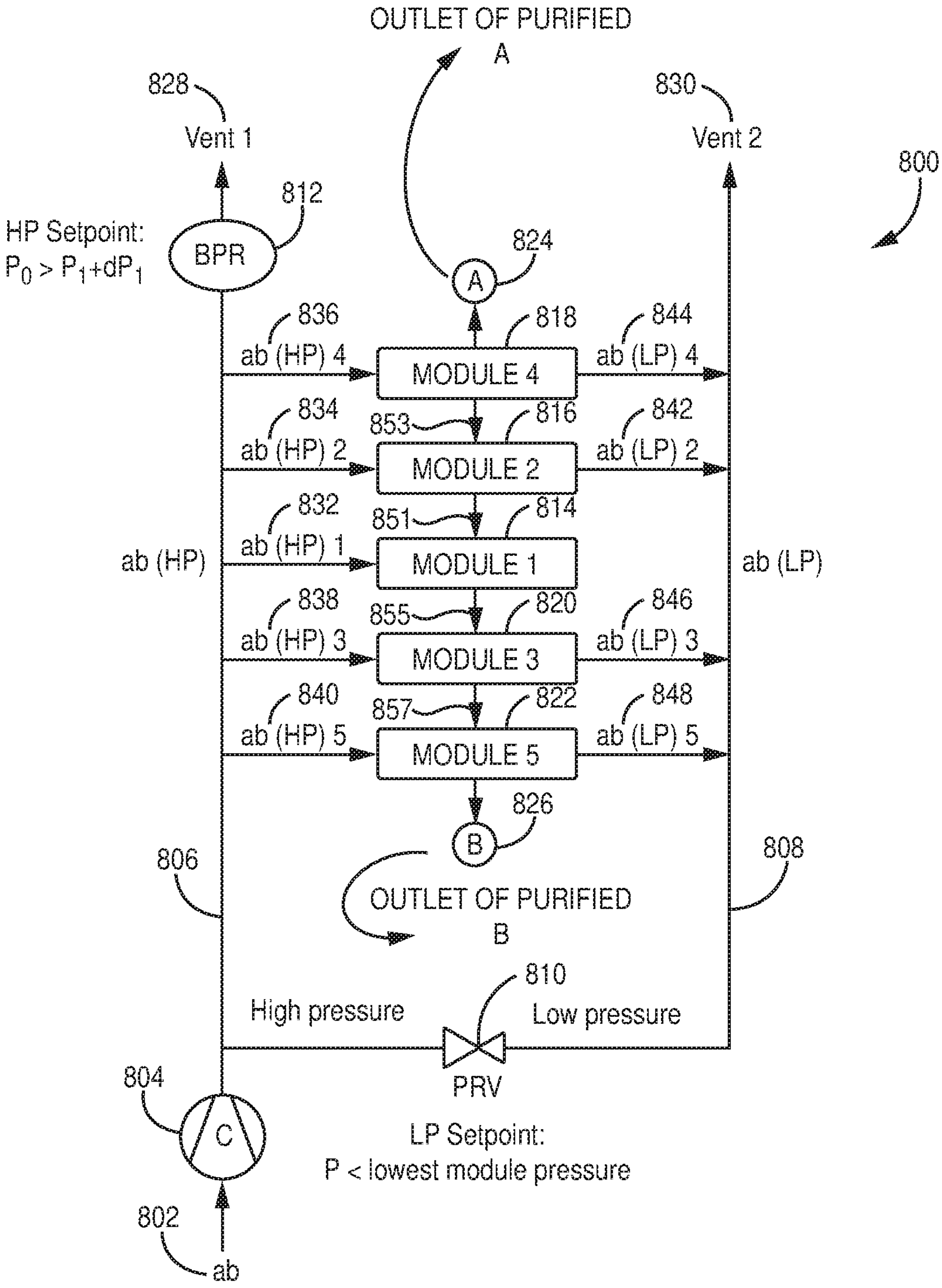
FIG. 9 is a schematic diagram of a gas separation apparatus including a central module and first gas-enrichment modules and second gas-enrichment modules, according to one or more embodiments of the invention.

FIG. 9 is a schematic diagram of a gas separation apparatus 800, according to one or more embodiments of the invention. In the illustrated embodiment, a fluid mixture inlet 802 may be provided for introducing a fluid mixture including at least a first gas and a second gas into the gas separation apparatus 800. A gas compressor 804 may be provided in-line with the fluid mixture inlet 802 for compressing the fluid mixture including the at least a first gas and a second gas. Upon entering the fluid mixture inlet 802, the fluid mixture may be split into a flow through a high pressure stream 806 and a flow through a low pressure stream 808. A pressure reducing valve 810 may be positioned between the high pressure stream 806 and the low pressure stream 808 to control the pressure of low pressure stream 808. The high pressure stream 806 and the low pressure stream 808 may each include an outlet. For example, a first vent 828 may be fluidly connected to the high pressure stream 806 via a back pressure regulator 812. A second vent 830 may be fluidly connected to the low pressure stream 808. One or more modules 814, 816, 818, 820, 822 may be fluidly connected to the high pressure stream 806 via one or more of conduits 832, 834, 836, 838, 840 and to the low pressure stream 808 via one or more of conduits 842, 844, 846, 848. In some embodiments, a central module 814 is fluidly connected to one or more first gas-enrichment modules 816, 818 via conduits 851, 853 and to one or more second gas-enrichment modules 820, 822 via conduits 855, 857. An outlet 824 for a fluid mixture enriched in the first gas may be fluidly connected to one or more of the modules 814, 816, 818. An outlet 826 for a fluid mixture enriched in the second gas may be fluidly connected to one or more of the modules 814, 820, 822.

According to one or more embodiments, the method of magnetic swing absorption may include one or more of the following steps which may be performed in any order: feeding a first fluid mixture including at least a first gas and a second gas into a separation chamber including a liquid absorbent; applying a constant inhomogeneous magnetic field to at least a portion of the liquid absorbent to initiate and/or enhance selective absorption and/or selective desorption of at least one of the first gas and the second gas; purging a second fluid mixture which is enriched in at least one of the first gas and the second gas from the separation chamber; removing the constant inhomogeneous magnetic field from the portion of the liquid absorbent to initiate and/or enhance absorption and/or desorption of at least one of the first gas and the second gas; and purging a third fluid mixture which is enriched in at least one of the first gas and the second gas from the separation chamber.

According to one or more embodiments, a method of magnetic swing absorption may include one or more of the following steps which may be performed in any order: feeding a first fluid mixture including at least a first gas and a second gas into a separation chamber including a liquid absorbent; applying a constant inhomogeneous magnetic field to at least a portion of the liquid absorbent to initiate and/or enhance selective absorption of at least the first gas; purging a second fluid mixture which is enriched in at least the second gas from the separation chamber; removing the constant inhomogeneous magnetic field from the portion of the liquid absorption to initiate selective desorption of the at least first gas; and purging a third fluid mixture which is enriched in at least the first gas from the separation chamber. In some embodiments, the liquid absorbent does not include a foaming agent.

According to one or more embodiments, a method of magnetic swing absorption may include one or more of the following steps which may be performed in any order: feeding a first fluid mixture including at least a first gas and a second gas into a separation chamber including a liquid absorbent; absorbing at least the first gas from the fluid mixture using the liquid absorbent; purging a second fluid mixture which is enriched in at least the second gas from the separation chamber; applying a constant inhomogeneous magnetic field to at least a portion of the liquid absorption to initiate desorption of the at least first gas; and purging a third fluid mixture which is enriched in at least the first gas from the separation chamber. In some embodiments, the liquid absorbent includes a foaming agent.

Figure 10:
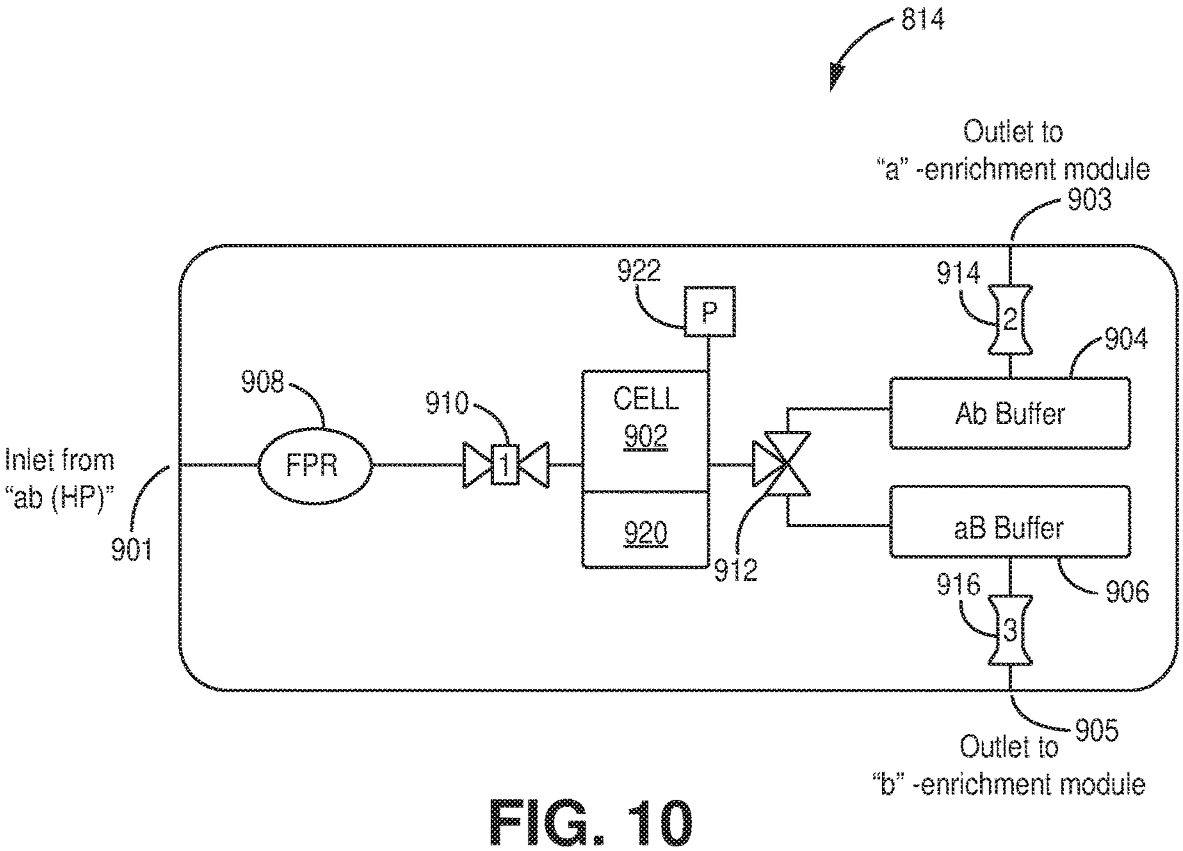
FIG. 10 is a schematic diagram of the central module depicted in FIG. 9, according to one or more embodiments of the invention.

FIG. 10 is a schematic diagram of the central module 814 used in the gas separation apparatus 800 illustrated in FIG. 9, according to one or more embodiments of the invention. In the illustrated embodiment, the central module 814 may include an inlet conduit 901 in fluid communication with conduit 832 for receiving the fluid mixture from the high pressure stream 806. An absorption cell 902 may receive the fluid mixture from the inlet conduit 901 and may include a separation chamber in which the liquid absorbent and the fluid mixture may be held and/or contacted with each other. A magnet 920 may be provided proximal to the absorption cell 902 for generating a magnetic field that may be switched on and off. For example, an electromagnet may be used, or a permanent magnet may be moved such that the liquid absorbent is positioned within or without the generated magnetic field. A pressure sensor 922 may also be provided proximal to the absorption cell 902.

In some embodiments, a constant inhomogeneous magnetic field is generated by an electromagnet, permanent magnet, or a permanent magnetic assembly. An example of a permanent magnetic assembly includes, without limitation, Halbach cylinders. A Halbach cylinder of any type, with one or more of dipole, quadrupole, sextupole, octupole, or other, magnetic field inside their bore opening may be utilized herein as they are capable of applying a strong inhomogeneous magnetic field. For example, even a dipole Halbach cylinder, produces a magnetic field inside the bore that is substantially inhomogeneous, with higher magnetic flux densities close to the magnetic poles (e.g., near the bore wall). In some embodiments, absorption cells with cylindrical geometries and/or small diameters are used because they can be inserted inside the bore of the Halbach cylinder. In some embodiments, an outer diameter of the absorption cell is selected based on an inner diameter of the bore of the Halbach cylinder or any other magnetic field-producing member. For example, in some embodiments, the outer diameter of the absorption cell and the inner diameter of the bore are close in range, or close matching.

Upstream from the absorption cell 902, a front pressure regulator 908 and a valve 910 for regulating and/or controlling fluid flow through the conduit 901 may be installed in-line. Downstream from the absorption cell 902, a three-way valve 912 may be provided for directing fluid from the absorption cell 902. As shown the three-way valve 912 is provided between the absorption cell 902 and each of a first gas-enriched buffer 904 and a second gas-enriched buffer 906. A first gas-enriched fluid mixture may be directed from the absorption cell 902 to the first gas-enriched buffer 904. From the first gas-enriched buffer 904, the first gas-enriched fluid mixture may be directed to the first gas-enrichment module 816 through valve 914 and outlet 903 which is fluidly connected to conduit 851. A second gas-enriched fluid mixture may be directed form the absorption cell 902 to the second gas-enriched buffer 906. From the second gas-enriched buffer 906, the second gas-enriched fluid mixture may be directed to the second gas-enrichment module 820 through valve 916 and outlet 905 which is fluidly connected to conduit 855.

Figure 11:
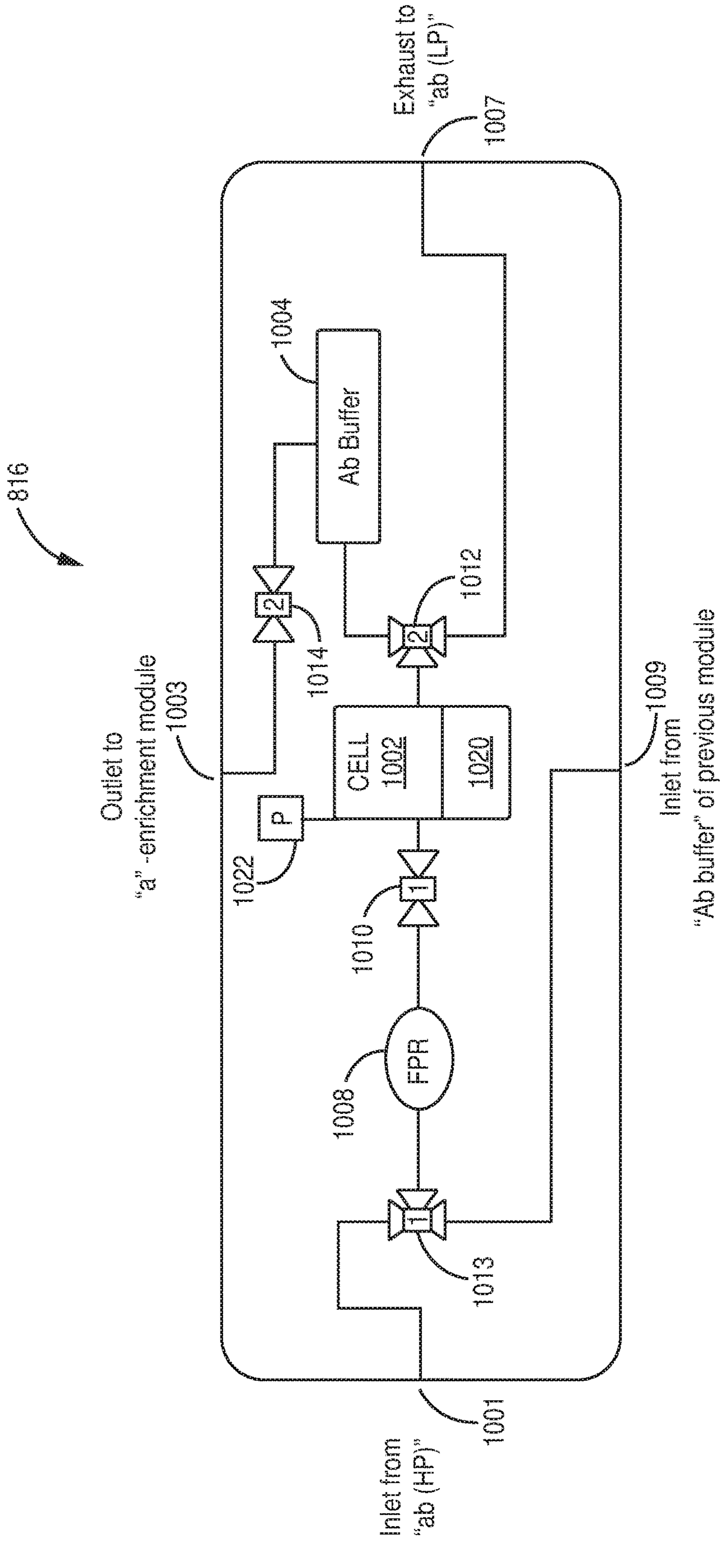
FIG. 11 is a schematic diagram of a first gas-enrichment module depicted in FIG. 9, according to one or more embodiments of the invention.

FIG. 11 is a schematic diagram of a first gas-enrichment module used in the gas separation apparatus 800, according to one or more embodiments of the invention. In some embodiments, the first gas-enrichment module depicted in FIG. 11 includes the first gas-enrichment module 816. A conduit 1001 may be provided in fluid communication with conduit 834 for receiving the fluid mixture from the high pressure stream 806. A conduit 1009 may be provided in fluid communication with conduit 851 for receiving the first gas-enriched fluid mixture from module 814. A valve 1013 may be provided between conduits 1001 and 1009 for regulating and/or controlling fluid flow.

An absorption cell 1002 may receive one or more of the fluid mixture from conduit 1001 and the first gas-enriched fluid mixture from conduit 1009. A separation chamber (not shown) may be included within the absorption cell 1002 and may include the liquid absorbent. A magnet 1020 may be provided proximal to the absorption cell 1002. The magnet 1020 may be used to generate a magnetic field capable of being switched on and off. For example, an electromagnet may be used, or a permanent magnet may be moved (e.g., relative to the absorption cell) such that the liquid absorbent is positioned within the generated magnetic field or outside of said magnetic field. A pressure sensor 1022 may also be provided proximal to the absorption cell 1002.

Upstream from the absorption cell 1002, a front pressure regulator 1008 and a valve 1010 for regulating and/or controlling fluid flow through the conduit 1001 (or conduit 1009) may be installed in-line. Downstream from the absorption cell 1002, a three-way valve 1012 may be provided for directing fluid from the absorption cell 1002. As shown, the three-way valve 1012 is provided between the absorption cell 1002 and each of a first gas-enriched buffer 1004 and an outlet of conduit 1007. A first gas-enriched fluid mixture may be directed from the absorption cell 1002 to the first gas-enriched buffer 1004. From the first gas-enriched buffer 1004, the first gas-enriched fluid mixture may be directed to the first gas-enrichment module 818 through valve 1014 and conduit 1003 which is fluidly connected to conduit 853. A second gas-enriched fluid mixture may be directed form the absorption cell 1002 to the outlet of conduit 1007 which is fluidly connected to low pressure stream 808 via conduit 842.

Figure 12:
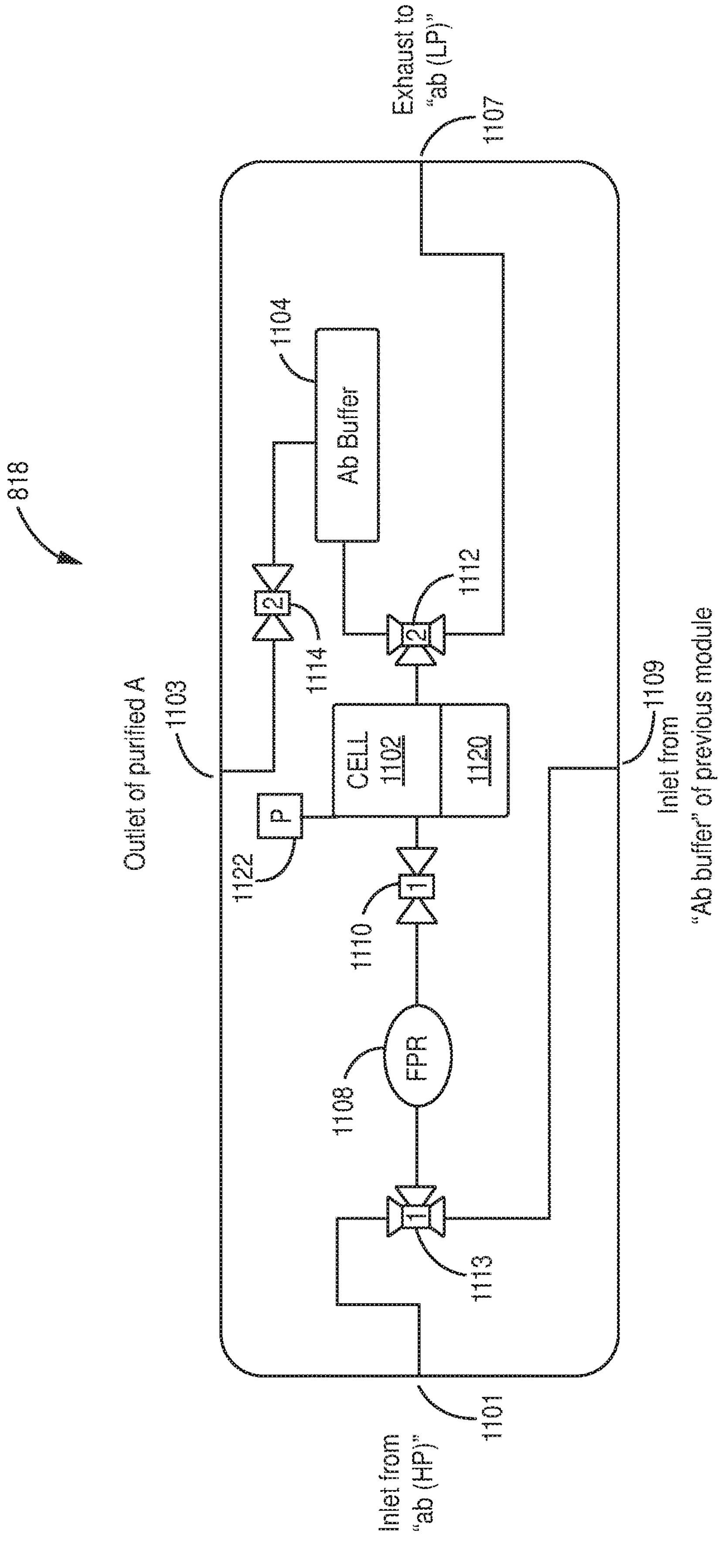
FIG. 12 is a schematic diagram of another first gas-enrichment module depicted in FIG. 9, according to one or more embodiments of the invention.

FIG. 12 is a schematic diagram of a first gas-enrichment module used in the gas separation apparatus 800, according to one or more embodiments of the invention. In some embodiments, the first gas-enrichment module depicted in FIG. 12 includes the first gas-enrichment module 818. A conduit 1101 may be provided in fluid communication with conduit 836 for receiving the fluid mixture from the high pressure stream 806. A conduit 1109 may be provided in fluid communication with conduit 853 for receiving the first gas-enriched fluid mixture from module 816. A valve 1113 may be provided between conduits 1101 and 1109 for regulating and/or controlling fluid flow.

An absorption cell 1102 may receive one or more of the fluid mixture from conduit 1101 and the first gas-enriched fluid mixture from conduit 1109. A separation chamber (not shown) may be included within the absorption cell 1102 and may include the liquid absorbent. A magnet 1120 may be provided proximal to the absorption cell 1102. The magnet 1120 may be used to generate a magnetic field capable of being switched on and off. For example, an electromagnet may be used, or a permanent magnet may be moved (e.g., relative to the absorption cell) such that the liquid absorbent is positioned within the generated magnetic field or outside of said magnetic field. A pressure sensor 1122 may also be provided proximal to the absorption cell 1102.

Upstream from the absorption cell 1102, a front pressure regulator 1108 and a valve 1110 for regulating and/or controlling fluid flow through the conduit 1101 (or 1109) may be installed in-line. Downstream from the absorption cell 1102, a three-way valve 1112 may be provided for directing fluid from the absorption cell 1102. As shown, the three-way valve 1112 is provided between the absorption cell 1102 and each of a first gas-enriched buffer 1104 and an outlet of conduit 1107. A first gas-enriched fluid mixture may be directed from the absorption cell 1102 to the first gas-enriched buffer 1104. From the first gas-enriched buffer 1104, the first gas-enriched fluid mixture may be directed to the outlet 824 through valve 1114 and conduit 1103. A second gas-enriched fluid mixture may be directed form the absorption cell 1102 to the outlet of conduit 1107 which is fluidly connected to low pressure stream 808 via conduit 844.

Figure 13:
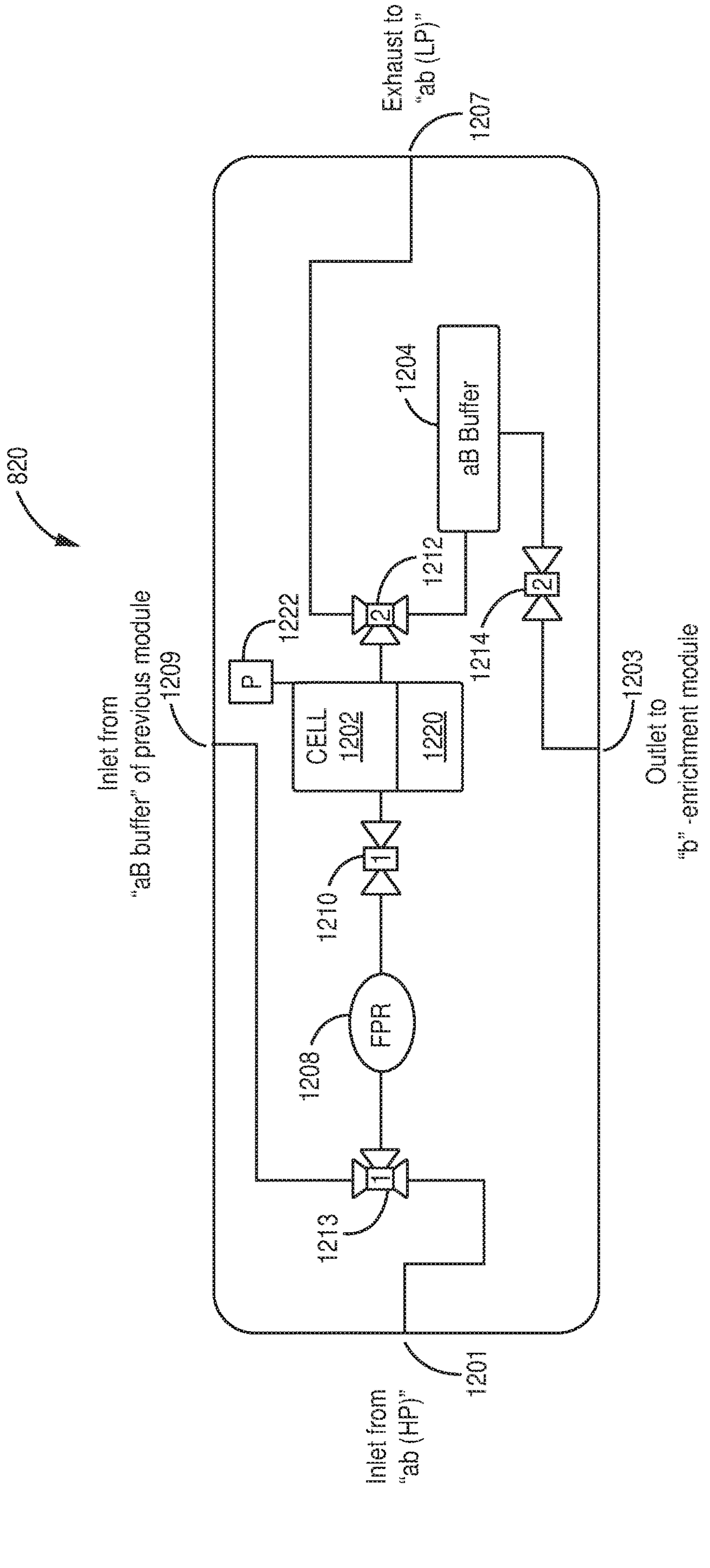
FIG. 13 is a schematic diagram of a second gas-enrichment module depicted in FIG. 9, according to one or more embodiments of the invention.

FIG. 13 is a schematic diagram of a second gas-enrichment module used in the gas separation apparatus 800, according to one or more embodiments of the invention. In some embodiments, the second gas-enrichment module depicted in FIG. 13 includes the second gas-enrichment module 820. A conduit 1201 may be provided in fluid communication with conduit 838 for receiving the fluid mixture from the high pressure stream 806. A conduit 1209 may be provided in fluid communication with conduit 855 for receiving the second gas-enriched fluid mixture from module 814. A valve 1213 may be provided between conduits 1201 and 1209 for regulating and/or controlling fluid flow.

An absorption cell 1202 may receive one or more of the fluid mixture from conduit 1201 and the second gas-enriched fluid mixture from conduit 1209 (or 1201). A separation chamber (not shown) may be included within the absorption cell 1202 and may include the liquid absorbent. A magnet 1220 may be provided proximal to the absorption cell 1202. The magnet 1220 may be used to generate a magnetic field capable of being switched on and off. For example, an electromagnet may be used, or a permanent magnet may be moved (e.g., relative to the absorption cell) such that the liquid absorbent is positioned within the generated magnetic field or outside of said magnetic field. A pressure sensor 1222 may also be provided proximal to the absorption cell 1202.

Upstream from the absorption cell 1202, a front pressure regulator 1208 and a valve 1210 for regulating and/or controlling fluid flow through the conduit 1201 (or 1209) may be installed in-line. Downstream from the absorption cell 1202, a three-way valve 1212 may be provided for directing fluid from the absorption cell 1202. As shown, the three-way valve 1212 is provided between the absorption cell 1202 and each of a second gas-enriched buffer 1204 and an outlet of conduit 1207. A second gas-enriched fluid mixture may be directed from the absorption cell 1202 to the second gas-enriched buffer 1204. From the second gas-enriched buffer 1204, the second gas-enriched fluid mixture may be directed to the second gas-enrichment module 822 through valve 1214 and conduit 1203 which is fluidly connected to conduit 857. A second gas-enriched fluid mixture may be directed form the absorption cell 1202 to the outlet of conduit 1207 which is fluidly connected to low pressure stream 808 via conduit 846.

Figure 14:
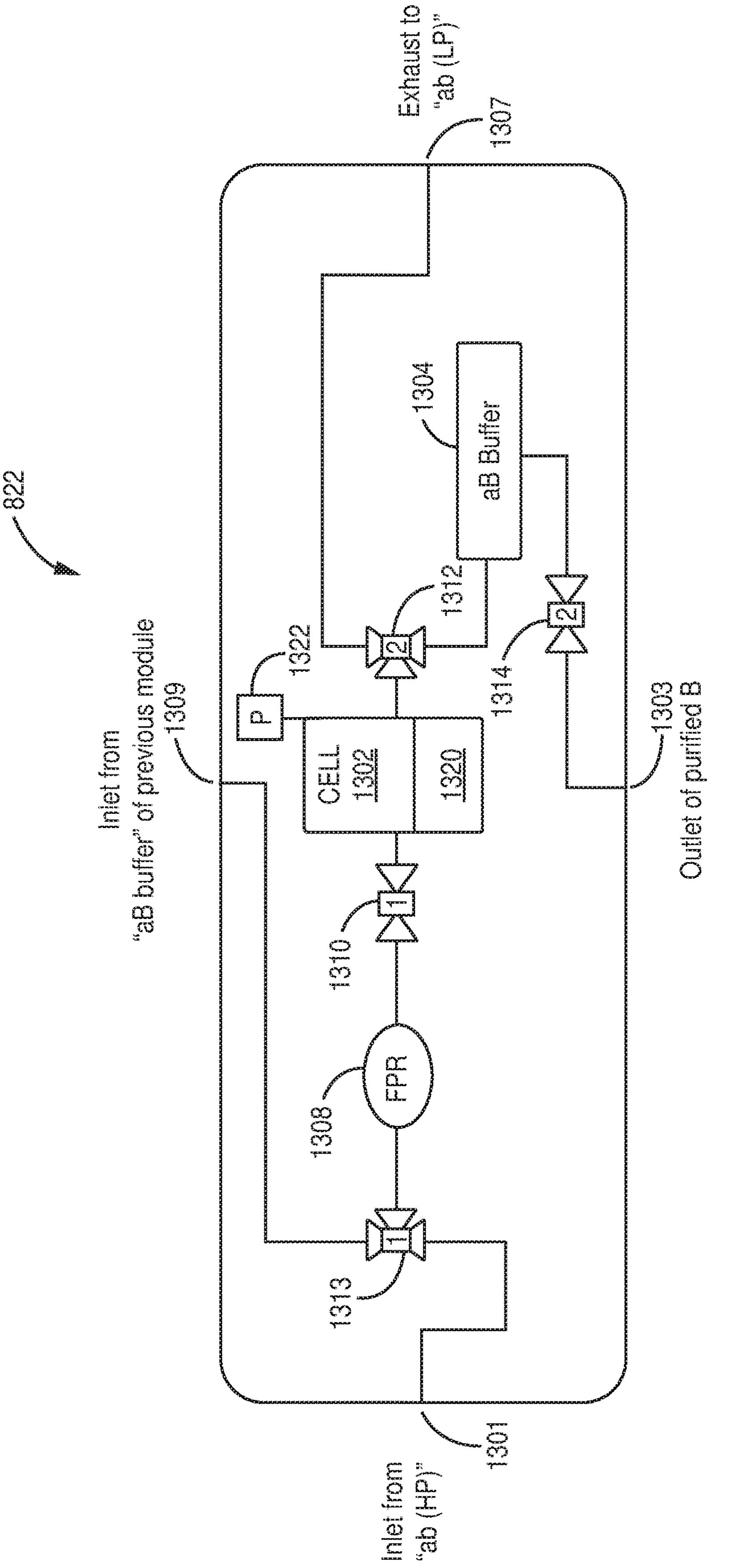
FIG. 14 is a schematic diagram of another second gas-enrichment module depicted in FIG. 9, according to one or more embodiments of the invention.

FIG. 14 is a schematic diagram of a second gas-enrichment module used in the gas separation apparatus 800, according to one or more embodiments of the invention. In some embodiments, the second gas-enrichment module depicted in FIG. 14 includes the second gas-enrichment module 822. A conduit 1301 may be provided in fluid communication with conduit 840 for receiving the fluid mixture from the high pressure stream 806. A conduit 1309 may be provided in fluid communication with conduit 857 for receiving the second gas-enriched fluid mixture from module 820. A valve 1313 may be provided between conduits 1301 and 1309 for regulating and/or controlling fluid flow.

An absorption cell 1302 may receive one or more of the fluid mixture from conduit 1301 and the second gas-enriched fluid mixture from conduit 1309. A separation chamber (not shown) may be included within the absorption cell 1302 and may include the liquid absorbent. A magnet 1320 may be provided proximal to the absorption cell 1302. The magnet 1320 may be used to generate a magnetic field capable of being switched on and off. For example, an electromagnet may be used, or a permanent magnet may be moved (e.g., relative to the absorption cell) such that the liquid absorbent is positioned within the generated magnetic field or outside of said magnetic field. A pressure sensor 1322 may also be provided proximal to the absorption cell 1302.

Upstream from the absorption cell 1302, a front pressure regulator 1308 and a valve 1310 for regulating and/or controlling fluid flow through the conduit 1301 (or 1309) may be installed in-line. Downstream from the absorption cell 1302, a three-way valve 1312 may be provided for directing fluid from the absorption cell 1302. As shown, the three-way valve 1312 is provided between the absorption cell 1302 and each of a second gas-enriched buffer 1304 and an outlet of conduit 1307. A second gas-enriched fluid mixture may be directed from the absorption cell 1302 to the second gas-enriched buffer 1304. From the second gas-enriched buffer 1304, the second gas-enriched fluid mixture may be directed to the outlet 826 through valve 1314 and conduit 1303. A second gas-enriched fluid mixture may be directed form the absorption cell 1302 to the outlet of conduit 1307 which is fluidly connected to low pressure stream 808 via conduit 848.

In some embodiments, each of the one or more modules 814, 816, 818, 820, 822 is independently functioning with its own independent cycling of four steps. In other words, the duration of each step may differ from module to module. For example, the duration of absorption may last until the moment when the absorption cell pressure of that module has dropped to the $P_i$ value set for each module and the duration of desorption lasts until the moment when the absorption cell pressure has reached the $P_i$+$dP_i$ value set for each module. One example of an implementation of the present invention is shown in Table 1 below, wherein the status of each module part is given for each of the four cycle steps:

Status of each module part during each cycle step

| Module | Part | Status: Step 1 ("aB"-purge) | Step 2 (desorption) | Step 3 ("ab"-purge) | Step 4 (absorption) |
|---|---|---|---|---|---|
| 1 | FPR (setpoint) | $P_1$ | $P_1$ | $P_1 + dP_1$ | $P_1 + dP_1$ |
| | Valve 1 | ON | OFF | ON | OFF |
| | Cell pressure | $P_1$ | rising | $P_1 + dP_1$ | dropping |
| | Magnet | ON | OFF | OFF | ON |
| | 3-way valve | To "aB buffer 1" | Closed | To "Ab buffer 1" | Closed |
| | Valve 2 | ON | ON | OFF | ON |
| | Valve 3 | OFF | ON | ON | ON |

-continued

| Status of each module part during each cycle step | | | | | |
|---|---|---|---|---|---|
| | | Status | | | |
| Module | Part | Step 1 ("aB"-purge) | Step 2 (desorption) | Step 3 ("ab"-purge) | Step 4 (absorption) |
| | EXIT to module 2 | Nothing | Nothing | "a"-enriched from "Ab buffer 1" | Nothing |
| | EXIT to module 3 | "b"-enriched from "aB buffer 1" | Nothing | Nothing | Nothing |
| 2 | 3-way valve 1 | To "ab (HP)" | Closed | To outlet of "Ab buffer/module 1" | Closed |
| | FPR (setpoint) | $P_2$ | $P_2$ | $P_2 + dP_2$ ($<P_1$) | $P_2 + dP_2$ |
| | Valve 1 | ON | OFF | ON | OFF |
| | Cell pressure | $P_2$ | rising | $P_2 + dP_2$ | dropping |
| | Magnet | ON | OFF | OFF | ON |
| | 3-way valve 2 | To "ab (LP)" | Closed | To "Ab buffer 2" | Closed |
| | Valve 2 | ON | ON | OFF | ON |
| | EXIT to "ab (LP)" | "b"-enriched directly from cell | Nothing | Nothing | Nothing |
| | EXIT to module 4 | Nothing | Nothing | "a"-enriched from "Ab buffer 2" | Nothing |
| 3 | 3-way valve 1 | To outlet of "aB buffer/module 1" | Closed | To "ab (HP)" | Closed |
| | FPR (setpoint) | $P_3$ | $P_3$ | $P_3 + dP_3$ ($<P_1$) | $P_3 + dP_3$ |
| | Valve 1 | ON | OFF | ON | OFF |
| | Cell pressure | $P_3$ | rising | $P_3 + dP_3$ | dropping |
| | Magnet | ON | OFF | OFF | ON |
| | 3-way valve 2 | To "aB buffer 3" | Closed | To "ab (LP)" | Closed |
| | Valve 2 | OFF | ON | ON | ON |
| | EXIT to "ab (LP)" | Nothing | Nothing | "a"-enriched directly from cell | Nothing |
| | EXIT to module 5 | "b"-enriched from "aB buffer 3" | Nothing | Nothing | Nothing |
| 4 | 3-way valve 1 | To "ab (HP)" | Closed | To outlet of "Ab buffer/module 2" | Closed |
| | FPR (setpoint) | $P_4$ | $P_4$ | $P_4 + dP_4$ ($<P_2$) | $P_4 + dP_4$ |
| | Valve 1 | ON | OFF | ON | OFF |
| | Cell pressure | $P_4$ | rising | $P_4 + dP_4$ | dropping |
| | Magnet | ON | OFF | OFF | ON |
| | 3-way valve 2 | To "ab (LP)" | Closed | To "Ab buffer 4" | Closed |
| | Valve 2 | ON | ON | OFF | ON |
| | EXIT to "ab (LP)" | "b"-enriched directly from cell | Nothing | Nothing | Nothing |
| | EXIT "A" | Nothing | Nothing | "a"-enriched from "Ab buffer 4" | Nothing |
| 5 | 3-way valve 1 | To outlet of "aB buffer/module 3" | Closed | To "ab (HP)" | Closed |
| | FPR (setpoint) | $P_5$ | $P_5$ | $P_5 + dP_5$ ($<P_3$) | $P_5 + dP_5$ |
| | Valve 1 | ON | OFF | ON | OFF |
| | Cell pressure | $P_5$ | rising | $P_5 + dP_5$ | dropping |
| | Magnet | ON | OFF | OFF | ON |
| | 3-way valve 2 | To "aB buffer 5" | Closed | To "ab (LP)" | Closed |
| | Valve 2 | OFF | ON | ON | ON |
| | EXIT to "ab (LP)" | Nothing | Nothing | "a"-enriched directly from cell | Nothing |
| | EXIT "B" | "b"-enriched from "aB buffer 5" | Nothing | Nothing | Nothing |

What is claimed is:

1. A method of magnetic swing absorption comprising:

contacting a fluid mixture and a liquid absorbent in a separation chamber, wherein the fluid mixture includes one or more gases and wherein the separation chamber is at a first pressure;

absorbing, by the liquid absorbent, at least one gas of said one or more gases of the fluid mixture, optionally in the presence of a constant inhomogeneous magnetic field, wherein the first pressure in the separation chamber decreases to a second pressure during absorption; and desorbing, from the liquid absorbent, the at least one gas absorbed by the liquid absorbent, optionally in the presence of the constant inhomogeneous magnetic field, wherein the second pressure in the separation chamber increases during desorption;

wherein the first pressure in the separation chamber represents a sum of a pressure contribution from one or more non-absorbed gases of the fluid mixture and a pressure contribution from the at least one gas absorbed by the liquid absorbent;

wherein the magnetic field is present in the region of the liquid absorbent at least during one of the absorbing or desorbing steps; and wherein absorbing by the liquid absorbent is performed in the presence of the constant inhomogeneous magnetic field and desorbing from the liquid absorbent is performed in the absence of the constant inhomogeneous magnetic field.

2. The method of magnetic swing absorption according to claim 1, wherein applying the constant inhomogeneous magnetic field to at least a portion of the liquid absorbent has one or more of the following effects: (i) increases a surface area of an interface between the fluid mixture and the liquid absorbent; (ii) decreases a surface area of an interface between the fluid mixture and the liquid absorbent; and (iii) changes a composition of an interface between the fluid mixture and the liquid absorbent.

3. The method of magnetic swing absorption according to claim 1, wherein, at times before equilibrium is reached, an amount of the at least one gas absorbed by the liquid absorbent in the presence of the constant inhomogeneous magnetic field is different than an amount of the at least one gas absorbed by the liquid absorbent in the absence of the constant inhomogeneous magnetic field.

4. The method of magnetic swing absorption according to claim 1, wherein the fluid mixture includes any combination of diamagnetic gases and paramagnetic gases.

5. The method of magnetic swing absorption according to claim 1, wherein the fluid mixture includes only diamagnetic gases.

6. The method of magnetic swing absorption according to claim 1, wherein the fluid mixture includes only paramagnetic gases.

7. The method of magnetic swing absorption according to claim 1, wherein the liquid absorbent includes one or more of a paramagnetic liquid, an ionic liquid, a solid magnetic component, and a foaming agent.

8. The method of magnetic swing absorption according to claim 1, wherein the liquid absorbent includes a paramagnetic ionic liquid and an optional foaming agent dissolved in the paramagnetic ionic liquid.

9. The method of magnetic swing absorption according to claim 1, wherein the liquid absorbent includes an ionic liquid, a solid magnetic component suspended in the ionic liquid, and an optional foaming agent dissolved in the ionic liquid.

10. The method of magnetic swing absorption according to claim 1, the liquid absorbent including a paramagnetic liquid, wherein the paramagnetic liquid includes one or more of trihexyl (tetradecyl) phosphonium ($[P_{6,6,6,14}^+]$), 1-ethyl-3-methylimidazolium ($[EMIM^+]$), 1-butyl-3-methylimidazolium ($[BMIM^+]$), 1-hexyl-3-methylimidazolium ($[C_6MIM^+]$), and 1-octyl-3-methylimidazolium ($[C_8MIM^+]$), and one or more of tetrachlorocobalt ($[CoCl_4^-]$), tetrachloroferrate ($[FeCl_4^-]$), tetrachloromanganese ($[MnCl_4^-]$), hexachlorogadolinium ($[GdCl_6^-]$), and tetrabromoferrate ($[FeBr_4^-]$).

11. The method of magnetic swing absorption according to claim 1, the liquid absorbent including a solid magnetic component, wherein the solid magnetic component includes one or more of magnetic particles and magnetic nanoparticles.

12. The method of magnetic swing absorption according to claim 1, the liquid absorbent including a solid magnetic component, wherein the solid magnetic component includes magnetic nanoparticles including one or more of the following: Fe, Co, Ni, Pt, Sm, Mn, Zn, Ba, Al, and Mg.

13. The method of magnetic swing absorption according to claim 1, wherein the liquid absorbent is regenerated without applying heat and/or a vacuum.

14. The method of magnetic swing absorption according to claim 1, further comprising purging, after absorbing or desorbing, a second fluid mixture from the separation chamber, wherein:

the second fluid mixture after absorbing is enriched in at least one gas of the one or more gases of the fluid mixture not absorbed by the liquid absorbent; and/or the second fluid mixture after desorbing is enriched in the at least one gas absorbed by the liquid absorbent.

* * * * *